(12) United States Patent
Hannu et al.

(10) Patent No.: US 11,736,537 B2
(45) Date of Patent: Aug. 22, 2023

(54) PROVIDING COMMUNICATION SERVICES USING SETS OF I/O USER DEVICES

(71) Applicant: Telefonaktiebolaget LM Ericsson (publ), Stockholm (SE)

(72) Inventors: Hans Hannu, Luleå (SE); Peter Ökvist, Luleå (SE); Tommy Arngren, Södra Sunderbyn (SE); Stefan Wänstedt, Luleå (SE); Kjell Larsson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/612,604

(22) PCT Filed: Jun. 11, 2019

(86) PCT No.: PCT/EP2019/065178
§ 371 (c)(1),
(2) Date: Nov. 19, 2021

(87) PCT Pub. No.: WO2020/249190
PCT Pub. Date: Dec. 17, 2020

(65) Prior Publication Data
US 2022/0217186 A1    Jul. 7, 2022

(51) Int. Cl.
*H04L 65/1073*   (2022.01)
*H04L 67/59*   (2022.01)
(Continued)

(52) U.S. Cl.
CPC .......... *H04L 65/1073* (2013.01); *G06F 9/452* (2018.02); *H04L 65/1059* (2013.01);
(Continued)

(58) Field of Classification Search
CPC ..... G06F 9/452; H04L 61/45; H04L 65/1059; H04L 65/1063; H04L 65/1069;
(Continued)

(56) References Cited

U.S. PATENT DOCUMENTS 6,795,808 B1    9/2004  Strubbe et al.
9,510,257 B2 *  11/2016 Sharma .................. H04W 4/02
(Continued)

FOREIGN PATENT DOCUMENTS

CN    1419686 A     5/2003
CN    104488293 A   4/2015

OTHER PUBLICATIONS

Examination Report for Indian Patent Application No. 202117042337 dated Sep. 13, 2022.
(Continued)

*Primary Examiner* — Thomas J Dailey
(74) *Attorney, Agent, or Firm* — Sage Patent Group

(57) ABSTRACT

A user terminal emulation server maintains a database identifying network addresses, UI capabilities, and communication protocols of I/O user devices. Communication sessions are established between a user terminal emulation application and a network entity and I/O user devices proximately located to a user and provide a combined I/O user interface. Delay profiles are determined between the application and the I/O user devices. A downlink flow from the network entity is split into a plurality of downlink flow components assigned to the I/O user devices. For each of the downlink flow components, the server formats the component for transmission to the assigned I/O user device, initiates transmission of the formatted downlink flow component to the assigned I/O user device, and controls timing for when the formatted downlink flow component is trans-
(Continued)

mitted to the assigned I/O user device based on the delay profile associated with the assigned I/O user device.

30 Claims, 12 Drawing Sheets

(51) Int. Cl.
| | |
|---|---|
| *H04L 65/1059* | (2022.01) |
| *H04L 65/1063* | (2022.01) |
| *H04L 65/1069* | (2022.01) |
| *H04L 67/52* | (2022.01) |
| *H04N 21/222* | (2011.01) |
| *H04N 21/233* | (2011.01) |
| *H04N 21/2343* | (2011.01) |
| *H04N 21/258* | (2011.01) |
| *H04W 4/16* | (2009.01) |
| *H04M 3/42* | (2006.01) |
| *G06F 9/451* | (2018.01) |
| *H04L 67/08* | (2022.01) |
| *H04W 4/02* | (2018.01) |
| *H04L 61/45* | (2022.01) |
| *H04L 69/24* | (2022.01) |
| *H04W 4/80* | (2018.01) |

(52) U.S. Cl.
CPC ...... *H04L 65/1063* (2013.01); *H04L 65/1069* (2013.01); *H04L 67/08* (2013.01); *H04L 67/52* (2022.05); *H04L 67/59* (2022.05); *H04M 3/42263* (2013.01); *H04N 21/222* (2013.01); *H04N 21/233* (2013.01); *H04N 21/2343* (2013.01); *H04N 21/25808* (2013.01); *H04W 4/16* (2013.01); *H04L 61/45* (2022.05); *H04L 69/24* (2013.01); *H04M 2203/2094* (2013.01); *H04M 2203/255* (2013.01); *H04W 4/02* (2013.01); *H04W 4/023* (2013.01); *H04W 4/80* (2018.02)

(58) Field of Classification Search
CPC ..... H04L 65/1073; H04L 67/08; H04L 67/52; H04L 67/59; H04M 3/42263; H04M 2203/2094; H04M 2203/255; H04N 21/222; H04N 21/233; H04N 21/2343
See application file for complete search history.

(56) References Cited

U.S. PATENT DOCUMENTS

| | | | |
|---|---|---|---|
| 2006/0091205 A1 | 5/2006 | Agrawal et al. | |
| 2014/0297251 A1 | 10/2014 | Morelli, Jr. et al. | |
| 2016/0266916 A1 | 9/2016 | Morelli et al. | |
| 2017/0026974 A1 | 1/2017 | Dey et al. | |
| 2018/0089347 A1* | 3/2018 | Yim | G06F 9/452 |
| 2018/0139297 A1* | 5/2018 | Demsey | H04L 65/1063 |
| 2021/0344520 A1* | 11/2021 | Hannu | H04L 65/1069 |
| 2021/0409481 A1* | 12/2021 | Hannu | H04L 67/025 |

OTHER PUBLICATIONS

International Search Report and Written Opinion of the International Searching Authority for PCT International Application No. PCT/EP2019/065178 dated Dec. 16, 2019.

Office Action dated Jun. 22, 2023 for Chinese Patent Application No. 201980096046.9, 5 pages.

* cited by examiner

PROVIDING COMMUNICATION SERVICES USING SETS OF I/O USER DEVICES

CROSS REFERENCE TO RELATED APPLICATION

This application is a 35 U.S.C. § 371 national stage application of PCT International Application No. PCT/EP2019/065178 filed on June 11, 2019, the disclosure and content of which is incorporated by reference herein in its entirety.

TECHNICAL FIELD

The present disclosure relates to a user terminal emulation server for providing communication services using sets of input and/or output (I/O) user devices, a method by a user terminal emulation server for providing communication services using sets of I/O user devices, and a computer program product for providing communication services using sets of I/O user devices.

BACKGROUND

The market for user terminals is driven by the quest to provide users with increasingly advanced communication and other operational features within the constraints of a portable handheld form factor. The development requirements for user terminal are increasingly complex as designers seek to integrate a greater variety of user interfaces and advanced operational features within the portable handheld form factor. Advancements in operational features have required more highly integrated and faster processing circuits with greater circuit densities, which becomes more difficult under constraints on costs and power consumption.

This all-inclusive feature-rich approach for user terminal development does not satisfy all of the myriad of differing desires held by consumers seeking solutions for the rapidly expanding variety of communication services. Moreover, the always-connected expectations of today's society obligates users to vigilantly keep their user terminals within reach or risk being unable to timely receive or initiate communication services.

SUMMARY

Various embodiments disclosed herein are directed to providing a centralized server based approach for emulating a user terminal using a networked set of input and/or output (I/O) user devices that are determined to be proximately located to a future location of a user and to have user interface (UI) capabilities that are combinable to provide a user with the ability to receive and/or initiate a communication service with a network entity. When a user is traveling, a user terminal emulation server (also referred to as "server" for brevity) can operate to identify a remote set of I/O user devices that satisfy a future proximity rule by being proximately located to a future location of the user and that further satisfy a combined capability rule for being combinable to provide a combined I/O user interface for the user to interface with the user terminal emulation application to provide the communication service. The user terminal emulation server can then provide the communication service between the user and the network entity upon the user arriving at the future location.

In one embodiment, a user terminal emulation server for providing communication services using sets of I/O user devices performs operations that include maintaining a database that identifies network addresses of I/O user devices, UI capabilities of the I/O user devices, and locations of the I/O user devices, based on content of received messages. The user terminal emulation server registers a network address of a user terminal emulation application and an identity of a user with a network entity providing communication services, where the user terminal emulation application is executed by the server. The user terminal emulation server receives a communication request from the network entity for establishing a communication service with the user. Responsive to the communication request, the user terminal emulation server determines whether a local set of I/O user devices among the I/O user devices identified by the database satisfy a present proximity rule by being proximately located to a present location of the user and to satisfy a combined capability rule for being combinable to provide a combined I/O user interface for the user to interface with the user terminal emulation application to provide the communication service as determined based on the UI capabilities identified by the database for the local set of I/O user devices and based on content of the communication request. When no local set of I/O user devices is determined to satisfy the present proximity rule and to satisfy the combined capability rule, the user terminal emulation server further determines whether a remote set of I/O user devices among the I/O user devices identified by the database satisfy a future proximity rule by being proximately located to a future location of the user and to satisfy the combined capability rule for being combinable to provide a combined I/O user interface for the user to interface with the user terminal emulation application to provide the communication service determined as determined based on the UI capabilities identified by the database for the remote set of I/O user devices and based on content of the communication request.

In some further embodiments, when a remote set of I/O user devices satisfies the future proximity rule and satisfies the combined capability rule, the user terminal emulation server responsively provides communication sessions between the user terminal emulation application and the remote set of I/O user devices and between the user terminal emulation application and the network entity. The user terminal emulation server then routes communication traffic that is received from at least one of the I/O user devices in the remote set toward the network entity for the communication service. For each data type that is received as communication traffic from the network entity, the user terminal emulation server selects one of the I/O user devices from among the remote set of I/O user devices based on matching characteristics of the data type to the UI capabilities identified by the database for the one of the I/O user devices, and then routes the data of the data type toward the network address of the selected one of the I/O user devices.

Some potential advantages of this and related embodiments include that a user can receive and initiate communication services without the necessity of a traditional all-inclusive feature-rich user terminal. The user terminal emulation server can adaptively combine the available UI capabilities of I/O user devices which are proximately located to a user to enable provision interfacing the user to a communication service. The myriad of types of I/O user devices that can be used with embodiments herein, as described below, are becoming ubiquitous nearly everywhere pursuant to the Internet of Things (IoT) revolution. The user terminal emulation server may dynamically respond to an incoming communication request directed to the user or an outgoing communication request initiated by the user by operationally communicating with available I/O user devices which may be proximately located to a user or which are identified at a future planned or suggested location of the user to form a combined user interface through which a user terminal emulation application executed by the server will provide user terminal functionality for a communication service. This server-based approach can provide low cost adaptable communication services to users.

The user thereby has reduced or no need to carry an expensive and all-inclusive user terminal, e.g. smart phone, that includes all necessary UI capabilities, e.g., display device, keyboard, speakers, etc. The user may instead carry a hardware device which operates to identify the user over a wireless communication interface to one or more of the I/O user devices. Various embodiments disclosed herein may disrupt the traditional handset-centric mobile communication industry as the features and capabilities of what forms a user terminal are not constrained to the domain of mobile phone manufacturers.

Other user terminal emulation servers, methods by user terminal emulation servers, and computer program products for use with user terminal emulation servers according to embodiments of the inventive subject matter will be or become apparent to one with skill in the art upon review of the following drawings and detailed description. It is intended that all such additional user terminal emulation servers, methods, and computer program products be included within this description, be within the scope of the present inventive subject matter, and be protected by the accompanying claims. Moreover, it is intended that all embodiments disclosed herein can be implemented separately or combined in any way and/or combination

BRIEF DESCRIPTION OF THE DRAWINGS

Aspects of the present disclosure are illustrated by way of example and are not limited by the accompanying drawings. In the drawings.

DETAILED DESCRIPTION

Figure 1:
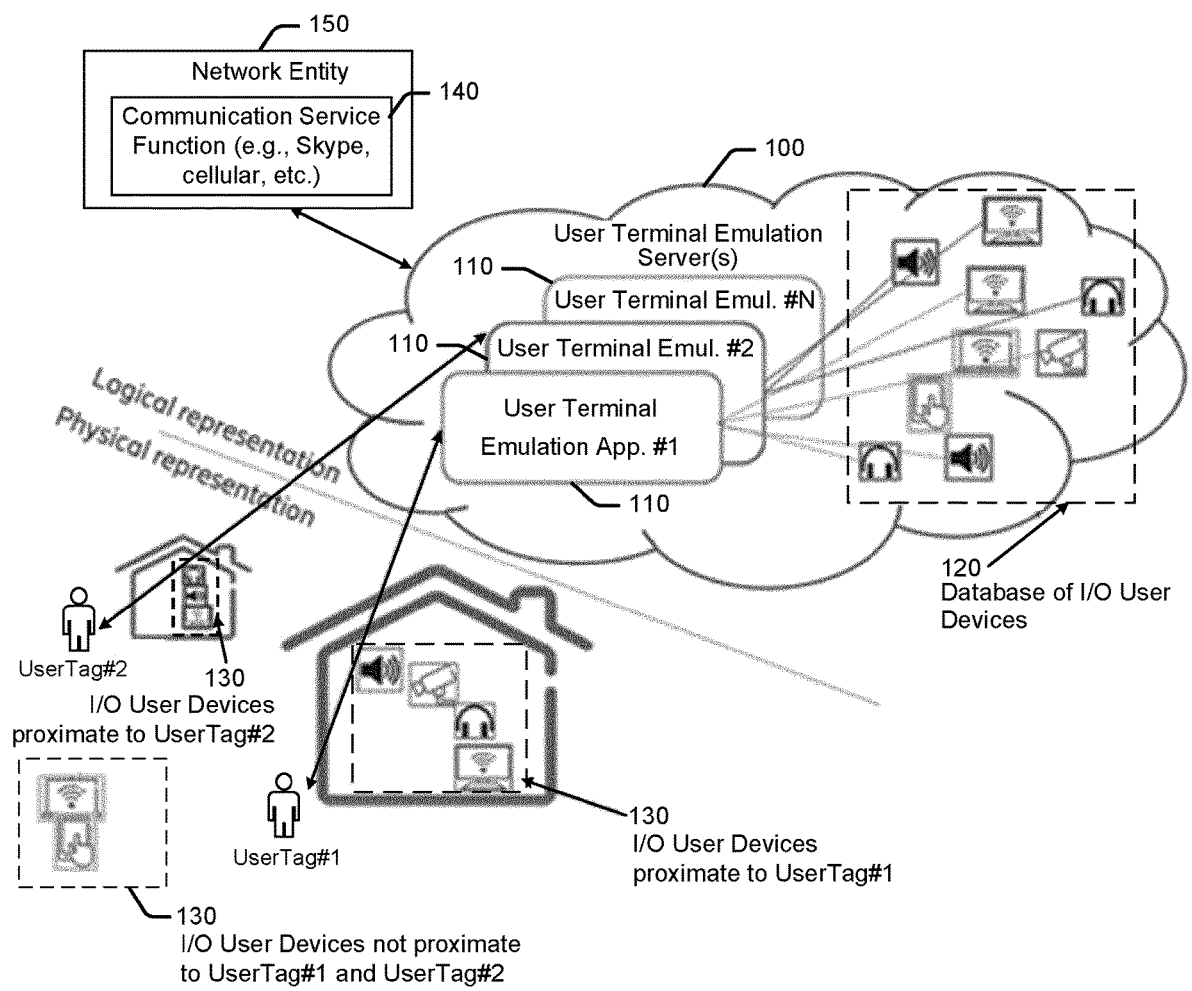
FIG. 1 illustrates a system with a user terminal emulation server that operationally integrates sets of I/O user devices that are proximately located to users to logically form virtualized user terminals providing communication services in accordance with some embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present or used in another embodiment.

Various embodiments disclosed herein are directed to improvements in operation of a centralized server based approach for emulating a user terminal using a networked set of input and/or output (I/O) user devices that are determined to be proximately located to a user and to have user interface (UI) capabilities that are combinable to provide a combined I/O user interface for the user to interface with a user terminal emulation application of the server to perform a communication service.

Some potential advantages of various embodiments disclosed herein include that a user can receive and initiate communication services without the necessity of a traditional all-inclusive feature-rich user terminal. The user terminal emulation server can adaptively combine the available UI capabilities of I/O user devices which are proximately located to a user to enable provision interfacing the user to a communication service. The user terminal emulation server may dynamically respond to an incoming communication request directed to the user or an outgoing communication request initiated by the user by operationally communicating with available I/O user devices which may be proximately located to a user or which are identified at a future planned or suggested location of the user to form a combined user interface through which a user terminal emulation application executed by the server will provide user terminal functionality for a communication service. This server-based approach can provide low cost adaptable communication services to users.

Dynamic allocation of I/O user device capabilities whenever and wherever the I/O user devices are in proximately located to a present location of a user and/or that are proximately located to a future planned or suggested location of the user, enables efficient and flexible use of any type of I/O user device. The term I/O user device can include, but is not limited to, cellular phones, tablet computers, laptop computers, desktop computers, networked cameras (e.g., surveillance cameras), networked microphones, wireless (e.g., Bluetooth, WiFi, light communication LiFi, and/or cellular) capable speakers, wired networked speakers, networked televisions, conference phones, computer keyboards, networked monitors, touch screen computer interfaces, smart watches, connected household appliances, connected cars, biometric sensor, retina scanner, accelerometer, tactile feedback generator, and any other type of electronic communication device that is capable of providing some UI functionality to a user during a communication service. Such I/O user devices are becoming ubiquitous nearly everywhere pursuant to the Internet of Things (IoT) revolution. The user thereby has reduced or no need to carry an expensive and all-inclusive user terminal, e.g. smart phone, that includes all necessary UI capabilities, e.g., display device, keyboard, speakers, etc. The user may instead carry a hardware device which operates to identify the user, referred to as a "UserTag", over a wireless communication interface, such as a near field communication (NFC) interface, to one or more of the I/O user devices. Various embodiments disclosed herein may disrupt the traditional handset-centric mobile communication industry as the features and capabilities of what forms a user terminal are not constrained to the domain of mobile phone manufacturers. A user terminal emulation server can operate to provide a user terminal, which can also be referred to as a SoftUE or a user terminal emulation application that is run by the user terminal emulation server.

FIG. 1 illustrates a system with a user terminal emulation server 100 that operationally integrates sets of I/O user devices 130 that are proximately located to users to logically emulate user terminals providing communication services in accordance with some embodiments of the present disclosure.

Referring to FIG. 1, the user terminal emulation server 100 may be a cloud resource that is networked to the remote from the I/O user devices 130, or may be more proximately located on a shared network with the I/O user devices 130. The user terminal emulation server 100 is configured to communicate with the I/O user devices 130 to identify which, if any, are located proximately to a user for use in providing UI capabilities during a communication service.

Users may carry a hardware tag, a.k.a. UserTag, which is capable of transmitting a unique user identifier through a communications interface, such as a near-field communications interface (e.g., Bluetooth, BLE, NFC, RFID, etc., or combinations thereof), for receipt by one or more of the I/O user devices 130 which are proximately located to the user. One type of UserTag can be a simple stand-alone electronic device having limited capability for transmitting an identifier through a near-field communications interface, which may use RF, electromagnetic, or optical signaling. Another type of UserTag can be a smartphone or smartwatch having cellular connectivity that transmits a cellular identity (e.g., from a SIM card) or an application identity through a cellular interface or a near-field communications interface.

The user identifier may alternatively or additionally be operationally determined by biometrics operations performed by, e.g., one or more of the I/O user devices 130. The biometrics operations may include, without limitation, one or more of voice recognition, image/face recognition, eye recognition, fingerprint recognition, or a combination thereof. The user identity may be determined based on credential provided by the user when, e.g., logging into an application or account. The user identity may be provided by a cell phone using information from the subscription SIM and proximity of the cell phone to one or more of the I/O user devices 130 can be determined using the phone's near-field communications (NFC) capability.

A user identifier, a UserTag identifier, and a user terminal application can be logically associated with each other in a database during a user registration process or as part of another setup process. For example, during a user registration process a user may obtain an account login identifier (serving as the user identifier) that is registered in the database as being associated with a UserTag identifier for a physical UserTag that has been provided to (e.g., purchased by) the user and being associated with a user terminal application that emulates a user terminal having defined capabilities (e.g., a cell phone providing cellular and over-the-type voice-over-IP communication services).

Figure 7:
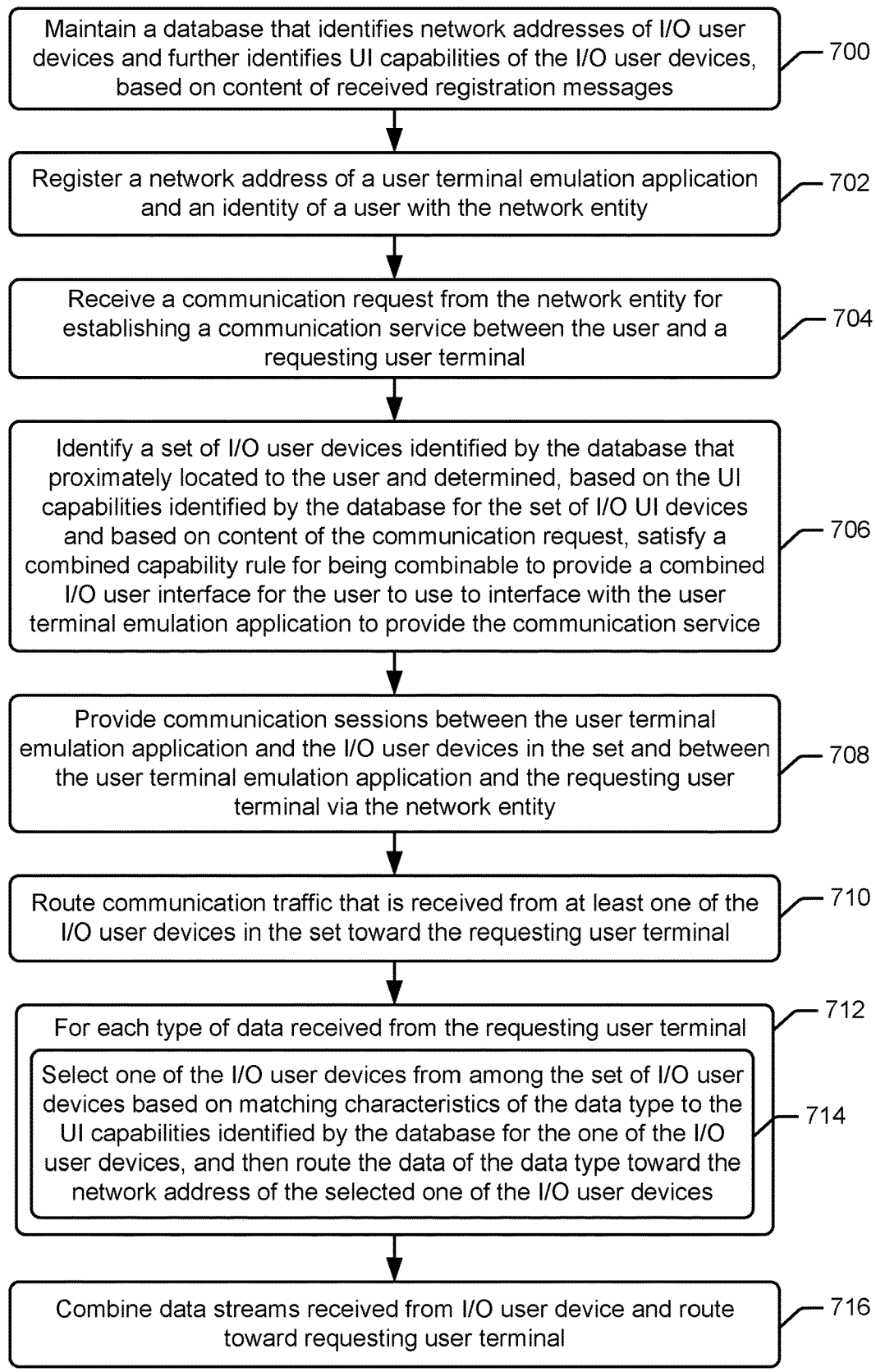
FIGS. 7 and 8 are flowcharts of operations that may be performed by a user terminal emulation server to provide communication services through a set of I/O user devices in accordance with some embodiments of the present disclosure.

Operations that can be performed by the system to provide communication services to a user are described below with further reference to FIG. 7, which is a flowchart of operations by the user terminal emulation server 100. Referring to FIGS. 1 and 7, the user terminal emulation server 100 maintains 700 a database 120 that identifies network addresses of I/O user devices 130 and further identifies UI capabilities of the I/O user devices 130, based on content of received registration messages. The UI capabilities of the I/O user devices 130 may be logically arranged in the database 120 based on the type of UI capability provided (e.g., display device, microphone, speaker, keyboard, and/or camera) and may be further arranged based on a quality of service provided by the UI capability and/or operational characteristic of the UI capability. An I/O user device 130 may communicate a registration message, containing its network address and UI capabilities, to the user terminal emulation server 100 responsive to an initial set up operation, responsive to being connected to a new communication network, and/or responsive to another defined event for triggering generation of a registration message. The registration messages may include a geographic location of the I/O user device 130, which can be stored in the database 120. The I/O user devices 130 may communicate with the server 100 via a data network (e.g., Internet and/or private network) using a WiFi transceiver, Bluetooth transceiver, cellular transceiver, light communication transceiver (LiFi), and/or another RF or light communications transceiver.

The user terminal emulation server 100 registers 702 a network address of a user terminal emulation application 110 and an identity of a user with a network entity 150 providing communication services. The network entity 150 provides a communication service function 140 which may, for example, correspond to an over-the-top Voice Over Internet Protocol (VoIP) service, Netflix service, Facebook service, Skype service, Internet browser service, a cellular communication service, etc. The user terminal emulation application 110 is executed by the user terminal emulation server 100. A user terminal emulation application 110 may run one or more applications that are normally run by a smart phone, such as a media streaming application (e.g., movie streaming service such as Netflix), social media application (e.g., Facebook, Instagram, etc.), Skype application, Internet browser application, voice phone call application, video and voice call application, camera processing application, display processing application, text messaging application, etc.

As illustrated in FIG. 1, a different instantiation of the user terminal emulation application 110 may be hosted by the server 100 for each user who is to be provided communication services (i.e., illustrated user terminal emulation applications #1-#N corresponding to users 1-N). The user terminal emulation application 110 may perform registration of the user with the network entity 150 and setup of a communication service with a user responsive to communication requests in accordance with the operations of FIG. 7.

When the communication service function 140 of the network entity 150 is a VoIP service, the operation to register 702 the network address of the user terminal emulation application and the identity of the user with the network entity 150 can include registering the network address of the user terminal emulation application 110 and the identity of the user with a network server of a VoIP communication service provider.

When the communication service function 140 of the network entity 150 is a cellular communication service, the operation to register 702 the network address of the user terminal emulation application and the identity of the user with the network entity 150 can include registering the network address of the user terminal emulation application 110 and the identity of the user with a Home Subscriber Server (HSS) or other network node of a core network operated by a cellular communication service provider.

The user terminal emulation server 100 may receive the registration messages from the I/O user devices using the Session Initiation Protocol (SIP)/Session Description Protocol (SDP), where each of the registration messages identifies the network address and the UI capability of one of the I/O user devices. The communication request may be received from the network entity 150 using the SIP/SDP, and the operation to provide communication sessions between the user terminal emulation application 110 and each of the I/O user devices in the set, and between the user terminal emulation application 110 and the requesting user terminal may be performing using the SIP/SDP.

A registration message from an I/O user device can include, for example, an IP address and port number, MAC address, fully qualified domain name (FQDN), and/or another network address, and further include information identifying the UI capability of the I/O user device. The I/O user device may respond to becoming powered-on by communicating the registration message to the user terminal emulation server 100.

The user terminal emulation server 100 receives 704 a communication request from the network entity 150 for establishing a communication service between the user and a requesting user terminal, e.g., a cellular phone, computer with Skype application, etc. Responsive to the communication request, the user terminal emulation server 100 identifies 706 a set of I/O user devices among the I/O user devices 130 identified by the database 120 that are determined to be proximately located to a location of the user and are further determined, based on the UI capabilities identified by the database 120 for the set of I/O user devices and based on content of the communication request, to satisfy a combined capability rule for being combinable to provide a combined I/O user interface for the user to interface with the user terminal emulation application 110 to provide the communication service.

Based on determining that the set of I/O user devices satisfies the combined capability rule, the user terminal emulation server 100 provides 708 communication sessions between the user terminal emulation application 110 and the I/O user devices in the set and between the user terminal emulation application 110 and the requesting user terminal via the network entity 150. The communication request that is received 704 by the user terminal emulation application 110 may contain an indication of a minimum UI capability that must be provided to the user during the communication service, such as: speaker only; combination of speaker and microphone; display only; combination of display device, speaker, and microphone; etc. The combined capability rule which is used by the server 100 to determine whether a communication service can be provided and by which set of I/O user devices, may thereby be defined based on the minimum UI capability that is indicated by the communication request.

The user terminal emulation server 100 then routes 710 communication traffic that is received from at least one of the I/O user devices in the set toward the requesting user terminal via the network entity 150. For each data type that is received as communication traffic from the requesting user terminal, the user terminal emulation server 100 selects one of the I/O user devices from among the set of I/O user devices based on matching characteristics of the data type to the UI capabilities identified by the database 120 for the one of the I/O user devices, and then routes the data of the data type toward the network address of the selected one of the I/O user devices.

As will be explained in further detail below, the server 100 may also combine 716 data streams are received from the I/O user devices in the set, and route the combined data streams towards the requesting user terminal, e.g., via the network entity 150.

Figure 8:
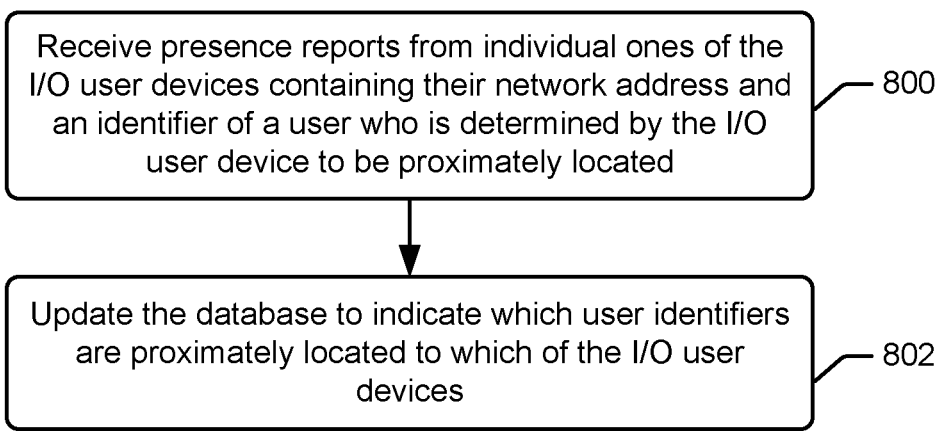

The user terminal emulation server 100 (e.g., the application 110 or an I/O user device handler described below) may be responsible for tracking which I/O user devices are proximately located to a present location of the user. FIG. 8 is a flowchart of corresponding operations. The server 100 can receive 800 presence reports from individual ones of the I/O user devices containing their network address and an identifier of a user who is determined by the I/O user device to be proximately located. For example, an I/O user device may read a hardware tag, also referred to herein as a "UserTag", through a NFC communication interface, may sense biometric information from the user, and/or may perform other operations to detect presence of a user and to identify the user. Responsive to the presence reports, the server 100 updates 802 the database 120 to indicate which user identifiers are proximately located to which of the I/O user devices.

With further reference to the example system of FIG. 1, a set of I/O user devices 130 has been determined by the instantiated user terminal emulation application #1 to be proximately located to a location of a first user carrying UserTag#1, and to further have UI capabilities that are combinable to satisfy the combined capability rule for providing a combined I/O user interface for the first user to use during a requested communication service. Application #1 responsively uses that set of I/O user devices 130 to provide a combined I/O user interface for use by the first user during a communication service via network entity 150 between the first user and another user terminal.

Similarly, another set of I/O user devices 130 has been determined by the instantiated user terminal emulation application #2 to be proximately located to a location of a second user carrying UserTag#2, and to further have UI capabilities that are combinable to satisfy the combined capability rule for providing a combined I/O user interface for the second user to use during a requested communication service. Application #2 responsively uses that set of I/O user devices 130 to provide a combined I/O user interface for use by the second user during a communication service via network entity 150 between the second user and yet another user terminal.

FIG. 1 also illustrates another set of I/O user devices 130, enclosed by dashed lines, that is not proximately located to either UserTag#1 or UserTag#2.

As explained above, the communication request which is requesting the establishment of communication service with an identified user may be initiated by the network entity 150 using the network address of the user terminal emulation application and identity of the user which were earlier registered with the network entity 150. However, the communication request may additionally or alternatively be generated by one of the I/O user devices 130 responsive to a command received from a proximately located user. For example, a user may operate a user interface provided by one of the I/O user devices 130 to initiate a combined audio and video call with another user. The user terminal emulation server 100 (e.g., the IODH or the application 110 for that user) receives the communication request along with the identity of the user, which may be sensed via the UserTag. The application 110 performs the identifying 706, providing 708, routing 710, selecting 712, and combining 716 operations described above for FIG. 7 to set up and operate a communication service between the user and the other user via the network entity 150.

Further example systems and related operations will now be described to further illustrate how I/O user devices having different UI capabilities can be operationally combined to provide a combined UI that can be used by user to satisfy the communication requirements of a communication service.

Further illustrative operations are described below regarding an example embodiment in which a speaker device is one of the I/O user devices 130 in the set capable of playing a received audio stream and a microphone device is one of the I/O user devices 130 in the set capable of sensing audio to output a microphone stream. Operations by the user terminal emulation application include updating the database 120 based on content of registration messages from the speaker device and the microphone device to identify network addresses of the speaker device and the microphone device, to identify UI capabilities of the speaker device as having a speaker capability and the microphone device as having a microphone capability, and to optionally also identify geographic locations of the speaker and microphone devices. The speaker UI capabilities may identify a number of speakers provided, sound loudness capability, and/or other operational characteristics. The microphone UI capabilities may identify a number of microphones provided, sensitivity the microphones, and/or other operational characteristics.

The speaker device and the microphone device are each identified as belonging to the set of I/O user devices that are determined to be proximately located to the location of the user (e.g., UserTag#1) and are further determined, based on the UI capabilities identified by the database 120, to satisfy the combined capability rule for being combinable to provide a combined I/O UI for the user to interface with the user terminal emulation application 110 to provide the communication service. Based on determining that the speaker device and the microphone device satisfy the combined capability rule, further operations are performed to route a microphone stream received from the microphone device toward the requesting user terminal (e.g., via network entity 150). When an audio stream is received as communication traffic from the requesting user terminal the operations select the speaker device based on matching an audio characteristic of the audio stream to the speaker capability identified by the database for the speaker device, and then route the audio stream toward the network address of the speaker device.

The example embodiment may include, when a display device is one of the I/O user devices in the set capable of displaying a received video stream, the operations update the database 120 based on content of registration messages to identify network addresses of the display device, to identify UI capabilities of the display device as having a display capability, and to optionally also identify a geographic location of the display device. The display UI capabilities may identify a screen display size, aspect ratio, pixel resolution, video frame rates supported, whether display device supports shared user support via split screen configuration, and/or other operational characteristics. The display device is also identified as among the set of I/O user devices that is determined to be proximately located to the location of the user and are further determined, based on the UI capabilities identified by the database 120, to satisfy the combined capability rule for being combinable to provide the combined I/O UI for the user to interface with the user terminal emulation application 110 to provide the communication service. Based on determining that the speaker device, the display device, and the microphone device satisfy the combined capability rule, further operations respond by to receipt of video stream as communication traffic from the requesting user terminal selecting the display device based on matching a video characteristic of the video stream to the display capability identified by the database 120 for the display device, and then routing the video stream toward the network address of the display device.

In the example embodiment the operations for routing the audio stream and the video stream toward the network addresses of the speaker device and the display device, respectively, may include when audio data and video data are received within a same stream from the requesting user terminal through a first communication session: separating the audio data from the video data; routing the audio data toward the network address of the speaker device through a second communication session; and routing the video data toward the network address of the display device through the second communication session or a third communication session.

The example embodiment may include, when a camera device is one of the I/O user devices in the set capable of outputting a camera stream, the operations update the database 120 based on content of a registration message to identify a network address of the camera device, to identify a UI capability of the camera device as having a camera capability, and to optionally also identify a geographic location of the camera device. The camera UI capabilities may identify a camera pixel count, image quality, light sensitivity, and/or other operational characteristics. The camera device is further identified as a member of the set of I/O user devices that are determined to be proximately located to the location of the user and is further determined, based on the UI capability identified by the database 120, to satisfy the combined capability rule for being combinable with the other I/O user devices in the set to provide the combined I/O UI for the user to interface with the user terminal emulation application 110 to provide the communication service. Based on determining that the camera device satisfies the combined capability rule, further operations are performed to route the camera stream received from the camera device toward the requesting user terminal, e.g., via the network entity 150.

The operations for routing the microphone stream received from the microphone device and the camera stream received from the camera device toward the requesting user terminal, can include: receiving the microphone stream from the microphone device through a first communication session; receiving the camera stream from the camera device through the first communication session or a second communication session; combining the microphone stream and camera stream in a combined stream; and routing the combined stream toward the requesting user terminal through a third communication session, e.g., via the network entity 150.

The example embodiment may include, when a keyboard device is one of the I/O user devices in the set capable of outputting key selection data responsive to key selections by a user among keys of the keyboard device, the operations can update the database 120 based on content of a registration message to identify a network address of the keyboard device and to identify a UI capability of the keyboard device as having a keyboard capability. The keyboard device capabilities may identify a key count, indication of whether the keyboard is a physical keyboard or a touch sensitive input device, and/or other keyboard capabilities. The keyboard device is further identified as a member of the set of I/O user devices that are determined to be proximately located to the location of the user and is further determined, based on the UI capability identified by the database 120, to satisfy the combined capability rule for being combinable with the other I/O user devices in the set to provide the combined I/O UI for the user to interface with the user terminal emulation application 110 to provide the communication service. Based on determining that the keyboard device satisfies the combined capability rule, further operations are performed to identify commands formed by the key selection data received from the keyboard and to perform operations that have been predefined as being triggered based on receipt of the identified commands.

The operations for routing the key selection data received from the keyboard device and microphone stream received from the microphone device, may include: receiving the key selection data from the keyboard device through a first communication session receiving the microphone stream from the microphone device through the first communication session or a second communication session; combining the key selection data and the microphone stream in a combined stream; and routing the combined stream toward the requesting user terminal through a third communication session, e.g., via the network entity 150.

Although various operations have been described in the context of the communication service being successfully set up when the requested user is determined to be proximately located to a set of I/O user devices that satisfy the combined capability rule for the communication service, this will not occur when a sufficient set of I/O user devices is not determined in that manner The corresponding operations that can be performed by the user terminal emulation application 110 when a communication service cannot be set up are explained below. In this example, the user terminal emulation application 110 receives another communication request from the network entity 150 for establishing another communication service between another user and another requesting user terminal. Responsive to the another communication request, the operations perform a determination of whether another set of I/O user devices among the I/O user devices identified by the database 120 are determined to be proximately located to a location of the another user and available for use for the another communication service and are further determined, based on the UI capabilities identified by the database 120 for the another set of I/O user devices, to satisfy the combined capability rule for being combinable to provide a combined I/O UI for the another user to interface with another user terminal emulation application to provide the another communication service. Based on determining that no other set of I/O user devices is determined to satisfy the combined capability rule and be proximately located to the location of the another user, the operations communicate a message to the network entity 150 indicating that the another communication service cannot be established. In this manner, the network entity 150 is informed that request a communication service cannot be set up at this time with the identified user.

Figure 2:
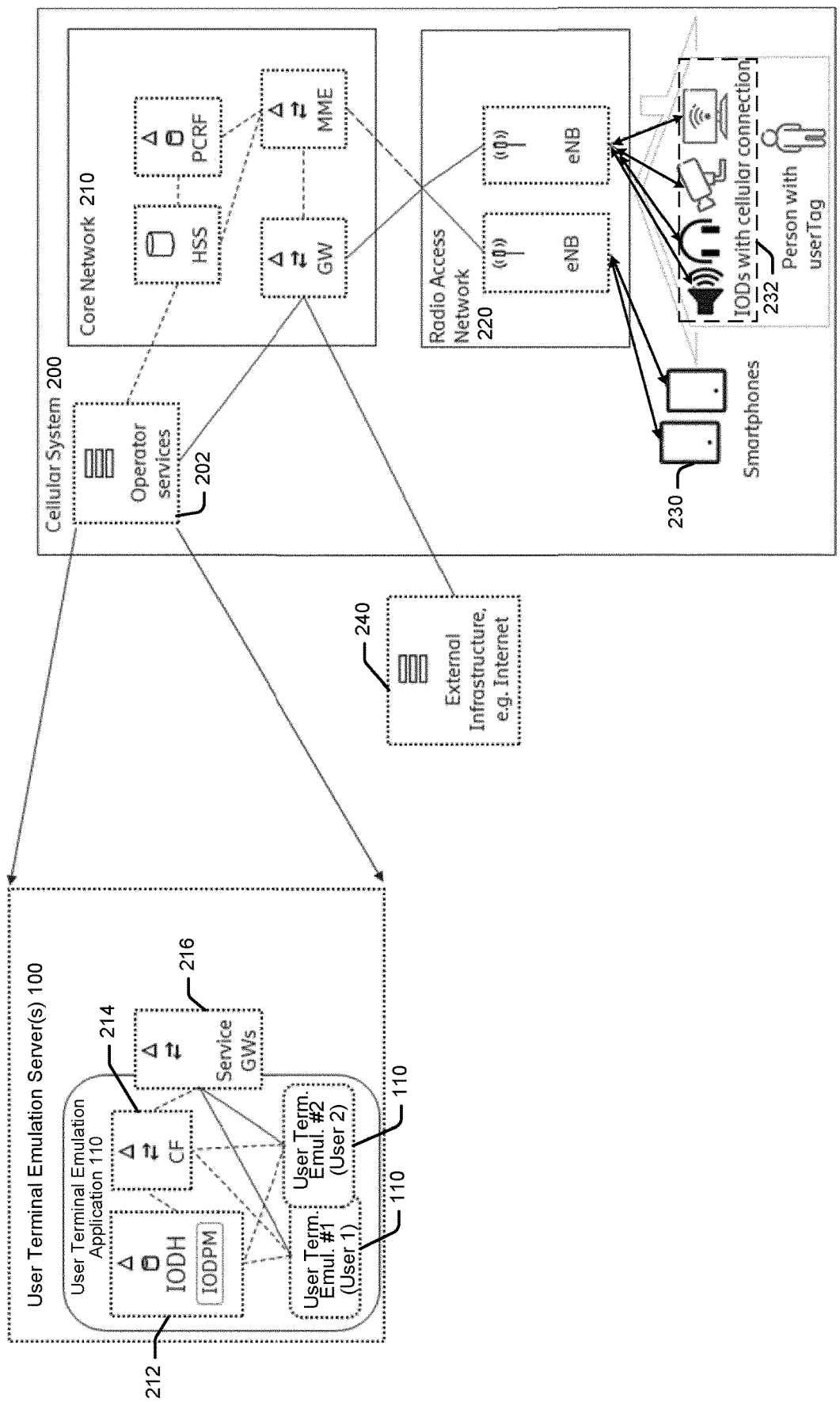
FIG. 2 is a block diagram illustrating the user terminal emulation server communicating with various elements of a cellular system to provide communication services in accordance with some embodiments of the present disclosure.

FIG. 2 is a block diagram illustrating the user terminal emulation server 100 as an element of an operator service node 202 within a cellular system 200. Referring to FIG. 2, the communication service function of the network entity 140 (FIG. 1) may be provided by the operator service node 202 or may be reached through external infrastructure 240, e.g., the Internet. The server 100 may, for example, be implemented in the radio access network 220 to provide edge computing with faster responsiveness or may be implemented within another node of the cellular system 200. The user terminal emulation server 100 can include an I/O user device handler (IODH) 212, a control function (CF) 214, the instantiated user terminal emulation applications 110, and a service gateway (GW) 216. A user terminal emulation application 110 may run one or more applications that are normally run by a smart phone, such as a Netflix application, Facebook application, Skype application, Internet browser application, etc.

The IODH 212 may perform operations to manage the I/O user devices, such as to handle maintenance (700 in FIG. 7) of the database 120 and/or perform registration (702 in FIG. 7) of the user terminal emulation applications 110. For example, the IODH 212 may operate to register with a Skype service server the IP address of a Skype application, which is run by or interfaced to the user terminal emulation application 110, and the user's Skype name The CF 214 may be responsible for assigning an IP address to each user terminal emulation application 110. The IP address to be assigned by the CF 214 may be received from the core network 210 functionality such as a PDN-GW. The service GW 216 may interconnect the user terminal emulation server 100 to a PSTN network, packet data network gateway of a 3GPP (3rd Generation Partnership Project) system, etc. The cellular system 200 can include a Core Network 210 having a Home Subscriber Server (HSS), a Policy and Charging Roles Function (PCRF), gateway (GW) and Mobility Management Entity (MME) providing control signaling related to mobile terminal mobility and security for the radio access. The HSS contains subscriber-related information and provides support functionality for user authentication and user access to the system. The PCRF enables QoS control per data flow and radio bearer, by setting QoS rules for each data flow, based on operator set policies and subscriber information. The GW can include a Serving GW (S-GW) and a Packet Data Network GW (PDN-GW), where the S-GW interconnects the core network 210 with the radio access network 220 and routes incoming and outgoing packets for the I/O user devices 232 and/or 130 and the user terminals 230. The PDN-GW interconnects the core network 210 with external infrastructure 240, such as the Internet, and allocates IP-addresses and performs policy control and charging.

Some I/O user devices 232 having cellular communication capability can communicate via, e.g., eNBs or other radio access nodes of a Radio Access Network 220 with the operator service node 202 via the core network 210. In the system of FIG. 2, the user terminal emulation server 100 may handle set up of a communication service between a selected set of the I/O user devices are proximate to a user and a remote user terminal 230 (e.g., smart phone) via the cellular system 200.

Figure 3:
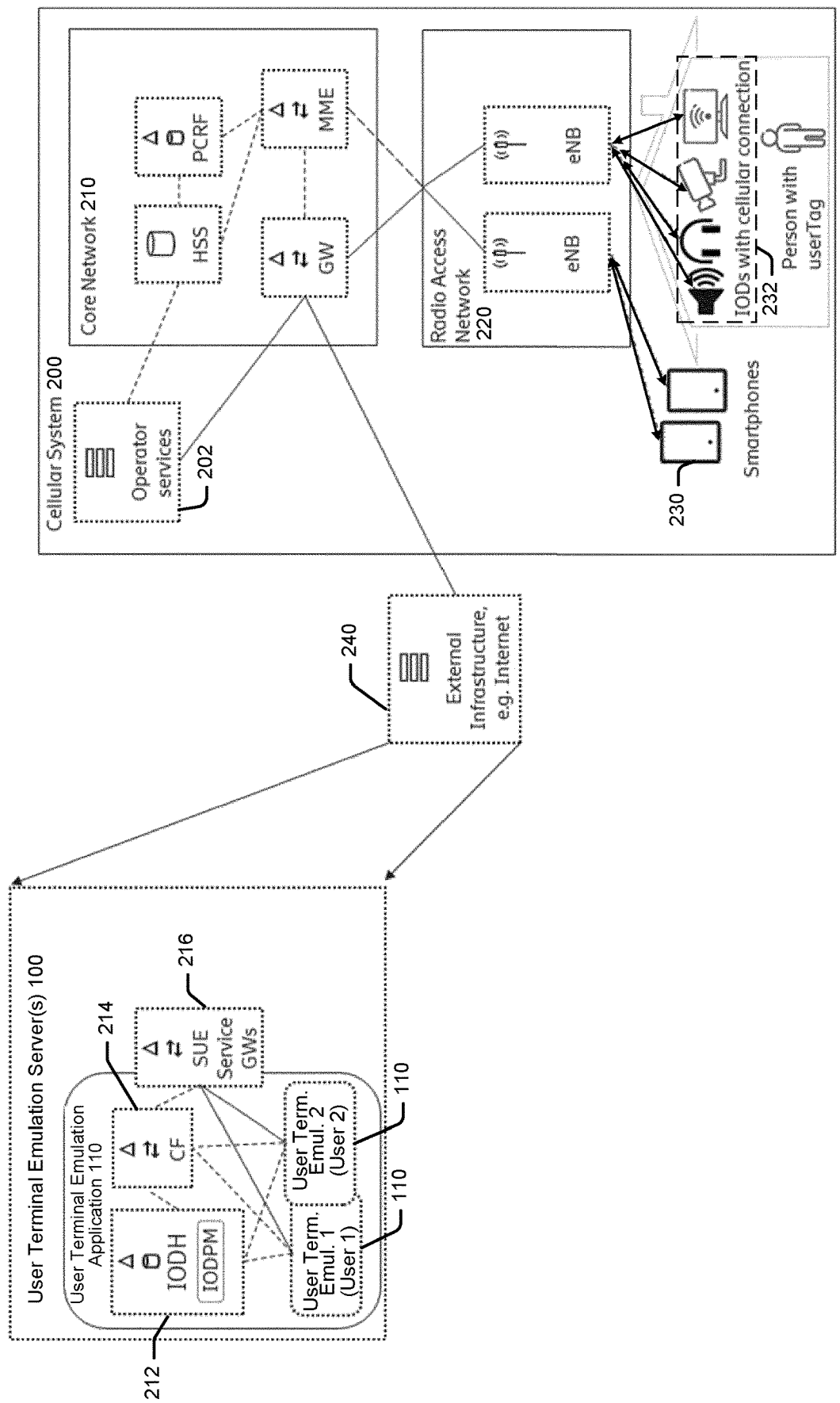
FIG. 3 is a block diagram illustrating the user terminal emulation server communicating in a different manner with various elements of a cellular system to provide communication services in accordance with some other embodiments of the present disclosure.

FIG. 3 is a block diagram illustrating the user terminal emulation server 100 communicating in a different manner with various elements of a cellular system 200, which may operate as the network entity 140 (FIG. 1), to provide communication services in accordance with some embodiments of the present disclosure. The system of FIG. 3 differs from the system of FIG. 2 by the user terminal emulation server 100 being an Internet service within external infrastructure 240 outside of the cellular system 200. In the system of FIG. 3, the CF 214 may determine the IP address to be assigned to different ones of the user terminal emulation applications 110 based on signaling from the Internet service within the external infrastructure 240.

The above and other operations will now be described in further detail in the context of three different example "use cases": 1) incoming call scenario; 2) outgoing call scenario; and 3) share of I/O user devices scenario (sharing of physical resources and/or capabilities).

Use Case 1: Incoming Call Scenario

This use case involves a user, with a UserTag or other way of being identified, being proximately located to I/O user devices 130 having different UI capabilities when an incoming call is received by the user terminal emulation server. Although operations are explained below in the context of identifying a user through a physical UserTag carried by the user, these operations are not limited thereto and may be used with any other way of identifying a user, such as by sensing biometric information that identifies the user.

A user terminal emulation application 110 may be instantiated or otherwise activated responsive by an incoming call (service, session) targeting the UserTag. The user terminal emulation application 110 can identify subscriptions associated with the UserTag (i.e. the physical user) and preferred methods of communication (e.g., audio not video, audio and video, etc.) that have been specified by the user, and determines the UI capabilities of the I/O user devices that will be needed to satisfy the UI capabilities which may be specified for the incoming communication session. The user terminal emulation application 110 may ask the IODH to identify which I/O user devices 130 are proximately located to the UserTag, and may further ask the IODH to determine or may determine itself whether the identified I/O user devices 130 are combinable to satisfy the UI capabilities specified by the incoming communication session. The user terminal emulation application 110 and/or the IODH may receive an ACK or NACK back on whether a sufficient set of I/O user devices 130 can be used to provide the communication service. If ACK, then the IODH also sets the state of the I/O user devices 130 in the set to in-use to avoid another user terminal emulation application 110 attempting to utilize the same I/O user devices 130 as which are presently in use. In case of NACK, the user terminal emulation application 110 and/or the IODH can take different actions to setup a reduced UI capability communication service with the user depending on user settings, e.g. only allow sound-based communications instead of a combination of sound and video responsive to when no display device is presently available for use. An example of no display device being available may occur when the only display device that is proximately located to the user is presently being used by another user to receive information from another user terminal emulation application during an ongoing communication service or when no display device is proximately located to the user.

Figure 4:
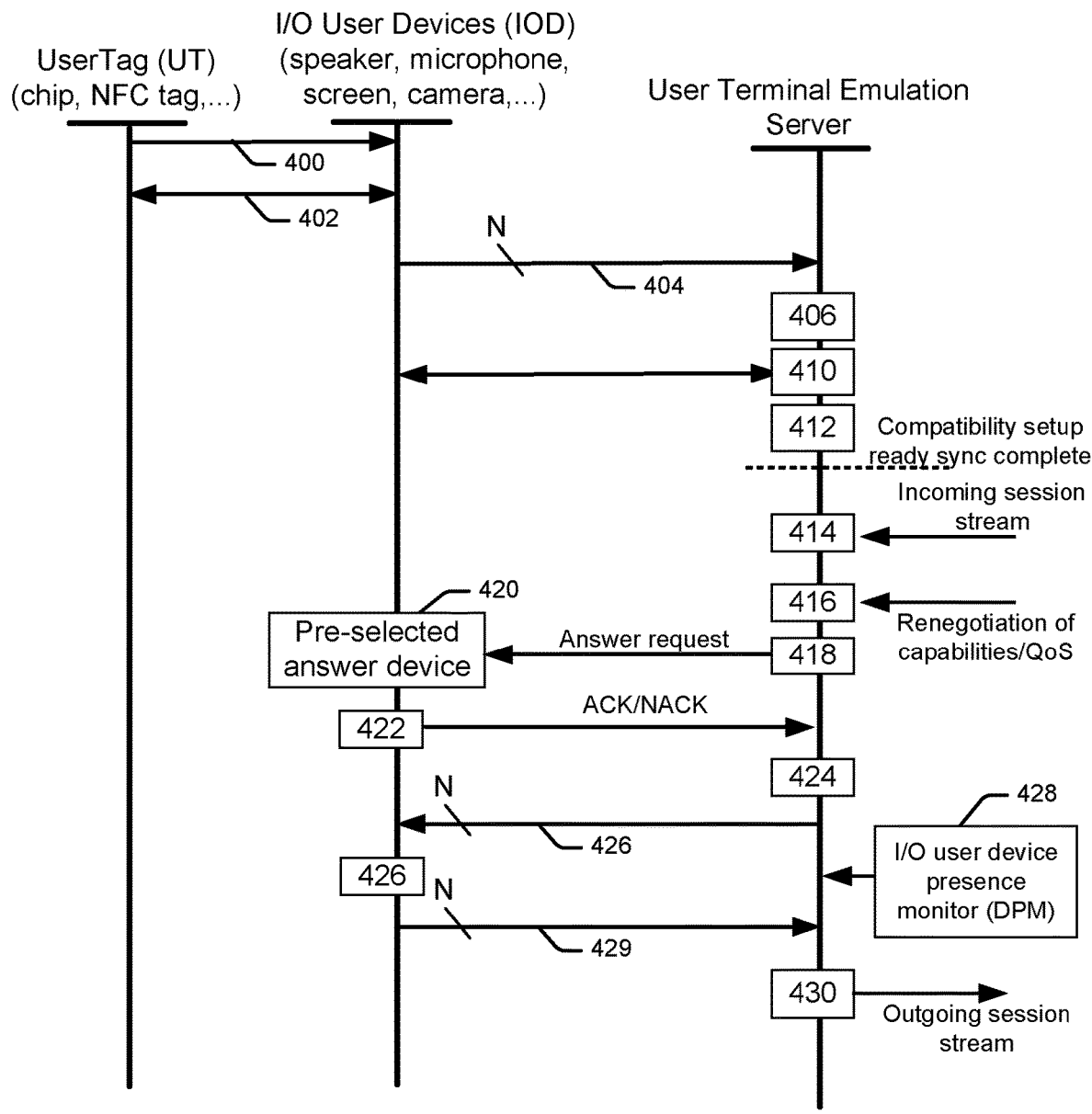
FIGS. 4-6 are combined flowcharts of operations and related data flows between UserTags, I/O user devices, and the user terminal emulation server in accordance with some embodiments of the present disclosure.

FIG. 4 is a combined flowchart of operations and related data flows between UserTags, I/O user devices, and the user terminal emulation server in accordance with some embodiments of the present disclosure. Referring to FIG. 4, a UserTag enters a room and signals 400 its presence to any proximately located and capable I/O user device in the room using a discovery beacon signal. Alternatively, one or more of the I/O user devices determines presence of the UserTag by polling 402, such as by periodically transmitting discover beacon signals that trigger responsive signaling by the UserTag. The I/O user devices that receive signaling indicating presence of the UserTag report 404 to the IODH in the user terminal emulation server along with a network address of the I/O user device (e.g., IP address, port number, MAC address, FQDN, etc.). The user terminal emulation application corresponding to the specific user (i.e., the UserTag) is updated 406 with respect to the detected user's presence. The IODH may operate to receive the notifications from the I/O user devices proximately located to the UserTag. Further UI capability discovery (synchronization) communications 410 are performed between the user terminal emulation server and the I/O user devices. The I/O user devices are associated to the user in the database, along with associated indications subscriptions, combinable UI capabilities provided by the set of I/O user devices which are proximately located to the UserTag. One or more of the I/O user devices may be selected for default call reception ACK/NACK. By operation 412 the user via the UserTag is now known to be reachable within the system through an identified set of I/O user devices with identified UI capabilities (e.g., speakers yes/no, display yes/no, microphone yes/no, keyboard yes/no, etc.), thereby creating a logical virtualized user terminal through which the user may be provided in a communication service. The user may initiate a communication service through a touchscreen, voice command sensed by a microphone, performing a defined gesture observable by a camera, and/or other input provided to one of the proximately located I/O user devices.

In operation 414, an incoming session (e.g., video call) from a requesting user terminal which is directed to the user (UserTag) arrives at the user terminal emulation server for the user carrying the UserTag. In operation 416 the combinable UI capabilities of the available I/O user devices is compared to the UI requirements of the incoming session.

When the UI requirements of the incoming session are not satisfied by the combinable UI capabilities of a local set of I/O user devices, the user terminal emulation server may: 1) determine whether a remote set of I/O user devices among the I/O user devices identified by the database 120 satisfy a future proximity rule by being proximately located to a future location of the user and to satisfy the combined capability rule for being combinable to provide a combined I/O user interface for the user to interface with the user terminal emulation application to provide the communication service as determined based on the UI capabilities identified by the database 120 for the remote set of I/O user devices and based on content of the communication request; and 2) when the remote set of I/O user devices satisfies the rules the server can also responsively provide the communication service using the remote set of I/O user devices and provide related guidance to the user for using the service. Alternatively or additionally, when the UI requirements are not satisfied the user terminal emulation server may renegotiate 416 the required UI capabilities (e.g., QoS) of the incoming session. Example operations that can be performed by elements of the system to determine whether a remote set of I/O user devices satisfies the future proximity rule and the combined capability rule, and to responsively provide the communication service using the remote set of I/O user devices and provide related guidance to the user for using the service are described below with regard to FIGS. 9-12.

In contrast, when the UI requirements of the incoming session are satisfied 418 by the combinable UI capabilities of the I/O user devices the user terminal emulation server prompts, via one or more of the available I/O user devices (e.g., a pre-selected answer device), the user carrying the UserTag to provide a session request answer (ACK/NACK). The user responds through the pre-selected answer device 420 to accept (ACK) or reject (NACK) the incoming session, to provide signaling 422 to the user terminal emulation server. When an ACK is received, operations 424 route an audio stream from the requesting user terminal to one of the I/O user devices in the set that has a speaker capability via one or more sessions 426, and routes a video stream from the requesting user terminal to another one of the I/O user devices in the set that has a display capability via one or more sessions 426. A data stream that is received from one of I/O user devices in the set through a one or more sessions 429 is routed 430 toward the requesting user terminal. When two or more data streams are received through one or more sessions 429 from the I/O user devices, they can be combined into a combined data stream that is routed 430 toward the requesting user terminal.

The user terminal emulation server may perform operations 428 to continuously monitor presence of the I/O user devices to determine when one or more of the I/O user devices is no longer proximately located to the user such that it can no longer be included as part of the combined UI used during the ongoing communication session. The user terminal emulation server may substitute the UI capability of another I/O user device to the set being used by the user for the ongoing communication session responsive to a previous member of the set no longer having required presence. Alternatively, the user terminal emulation server may: 1) determine whether a remote set of I/O user devices among the I/O user devices identified by the database 120 satisfy a future proximity rule by being proximately located to a future location of the user (e.g., along a planned route, a planned location, or a server suggested location) and to satisfy the combined capability rule for being combinable to provide a combined I/O user interface for the user to interface with the user terminal emulation application to provide the communication service as determined based on the UI capabilities identified by the database 120 for the remote set of I/O user devices and based on content of the communication request; and 2) when the remote set of I/O user devices satisfies the rules the server can also responsively provide the communication service using the remote set of I/O user devices and provide related guidance to the user for using the service. Again, example operations that can be performed by elements of the system to determine whether a remote set of I/O user devices satisfies the future proximity rule and the combined capability rule, to responsively provide the communication service using the remote set of I/O user devices and provide related guidance to the user for using the service are described below with regard to FIGS. 9-12.

Use Case 2, Outgoing Call

This use case involves a user, with a UserTag, being proximately located to I/O user devices 130 having different UI capabilities when an outgoing call (communication session) is received by the user terminal emulation server. The I/O user devices 130 are associated to the identified user via the user terminal emulation server 100 which handles all communications sessions for the user while the associated I/O user devices 130 are managed by an IODH.

A user terminal emulation application 110 may be instantiated or otherwise activated responsive by an outgoing call being requested by a user carrying the UserTag. The user may initiate an outgoing call through a touchscreen, voice command sensed by a microphone, performing a defined gesture observable by a camera, and/or other input provided to one of the proximately located I/O user devices.

The user terminal emulation application 110 can identify subscriptions associated with the UserTag (i.e. the physical user) and preferred methods of communication (e.g., audio not video, audio and video, etc.) that have been specified by the user, and determines the UI capabilities of the I/O user devices that will be needed to satisfy the UI capabilities which may be specified for the outgoing call. The user terminal emulation application 110 may ask the IODH to identify which I/O user devices 130 are proximately located to the UserTag, and may further ask the IODH to determine or may determine itself whether the identified I/O user devices 130 are combinable to satisfy the UI capabilities specified by the outgoing call. The user terminal emulation application 110 and/or the IODH may receive an ACK or NACK back on whether a sufficient set of I/O user devices 130 can be used to provide the communication service. If ACK, then the IODH also sets the state of the I/O user devices 130 in the set to in-use to avoid another user terminal emulation application 110 attempting to utilize the same I/O user devices 130 as which are presently in use. In case of NACK, the user terminal emulation application 110 and/or the IODH can take different actions to setup a reduced UI capability communication service with the user depending on user settings, e.g. only allow sound instead of the preferred sound and video responsive to when no display device is presently available for use (e.g., when presently used by another user terminal emulation application 110 or when none is proximately located to the UserTag).

Figure 5:
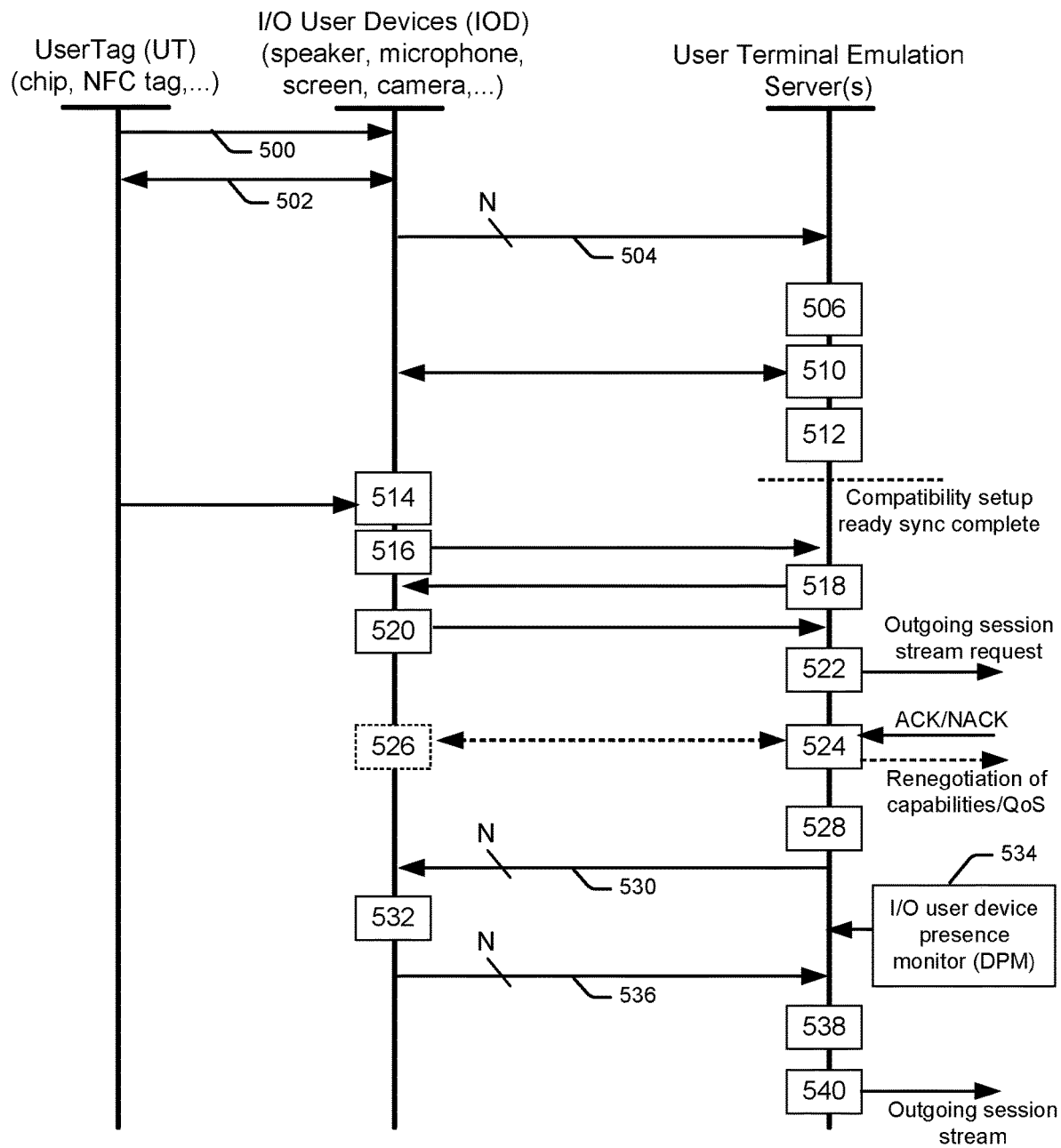

FIG. 5 is a combined flowchart of operations for an outgoing call and related data flows between UserTags, I/O user devices, and the user terminal emulation server in accordance with some embodiments of the present disclosure. Referring to FIG. 5, a UserTag enters a room and signals 500 its presence to any proximately located and capable I/O user device in the room using a discovery beacon signal. Alternatively, one or more of the I/O user devices determines presence of the UserTag by polling 502, such as by periodically transmitting discover beacon signals that trigger responsive signaling by the UserTag. The I/O user devices that receive signaling indicated presence of the UserTag report 504 to the IODH in the user terminal emulation server along with a network address of the I/O user device (e.g., IP address, port number, MAC address, (Fully Qualified Domain Name (FQDN), etc.). The user terminal emulation application corresponding to the specific user (i.e., the UserTag) is updated 506 with respect to the detected user's presence.

The IODH may operate to receive the notifications from the I/O user devices proximately located to the UserTag. Further UI capability discovery (synchronization) communications 510 are performed between the user terminal emulation server and the I/O user devices. The I/O user devices are associated to the user in the database, along with associated indications subscriptions, combinable UI capabilities provided by the set of I/O user devices which are proximately located to the UserTag. One or more of the I/O user devices may be selected for default call reception ACK/NACK. By operation 512 the user via the UserTag is now known to be reachable within the system through an identified set of I/O user devices with identified UI capabilities (e.g., speakers yes/no, display yes/no, microphone yes/no, keyboard yes/no, etc.), thereby creating a logical virtualized user terminal through which the user may be provided in a communication service. The user may initiate a communication service through a touchscreen, voice command sensed by a microphone, performing a defined gesture observable by a camera, and/or other input provided to one of the proximately located I/O user devices.

In operation 514, a user carrying the UserTag uses the UI of one of the I/O user devices to trigger 514 an outgoing call (e.g., video call) or another communication service, which triggers signaling 516 of the outgoing call to the user terminal emulation server. In operation 518 the IODH queries the user (e.g., displays a message, generates a sound, etc.) through one of the I/O user devices proximately located to the user to request the user to select among available types of communication methods (e.g., any one or more of the following: voice input, speaker output, video input, video output, output display device, keyboard input, etc) that can be presently used for the outgoing call or other communication service based on the combined UI capabilities of the set of I/O user devices that are determined to satisfy the present proximity rule and the combined capability rule for the outgoing call or other communication service.

When the combined UI capabilities of the local set of I/O user do not satisfy the UI requirements of the requested outgoing call or another communication service, or do not satisfy the user's request (e.g., receive a NACK response to the user query), the user terminal emulation server may: 1) determine whether a remote set of I/O user devices among the I/O user devices identified by the database 120 satisfy a future proximity rule by being proximately located to a future location of the user and to satisfy the combined capability rule for being combinable to provide a combined I/O user interface for the user to interface with the user terminal emulation application to provide the outgoing call or other communication service as determined based on the UI capabilities identified by the database 120 for the remote set of I/O user devices and based on content of the outgoing call request or based on other information received from the user. Example operations that can be performed by elements of the system to determine whether a remote set of I/O user devices satisfies the future proximity rule and the combined capability rule are described below with regard to FIGS. 9-12.

When the combined UI capabilities of the local set of I/O user do satisfy the UI requirements of the requested outgoing call or another communication service and/or do satisfy the user's request (e.g., receive an ACK response to the user query), one of the I/O user devices provides responsive signaling 520 to the IODH indicating the user's selected type of communication method for the outgoing call. In operation 522 the user terminal emulation server communicates an outgoing session stream request to the network entity 150, where the request may include an identifier of the calling user, identifier of the user terminal of the called user, and a quality of service for the communication session. In operation 522, the user terminal emulation server receives a communication session acceptance (ACK) or denial (NACK) from the network entity 150. When the communication session is denied, the user terminal emulation server may attempt to renegotiate 524 the requested communication session such as at a lower quality of service.

When the communication session is accepted (ACK), for each data type that is received 528 as communication traffic from the requesting user terminal, the user terminal emulation server selects one of the I/O user devices from among the set of I/O user devices based on matching characteristics of the data type to the UI capabilities identified by the database for the one of the I/O user devices, and then routes 530 the data of the data type toward the network address of the selected one of the I/O user devices. The data originating ones of the I/O user devices transmit 532 data stream through one or more sessions 536 to the user terminal emulation server, which may combine 538 the data streams into a combined data stream that is routed 540 toward the called user terminals via the network entity 150.

The user terminal emulation server may continuously monitor 534 presence of the I/O user devices to determine when one or more of I/O user devices is no longer proximately located to the user such that it can no longer be included as part of the combined UI be provided during the ongoing communication session. The user terminal emulation server may substitute the UI capability of another I/O user device to the set being used by the user for the ongoing communication session responsive to a previous member of the set no longer having required presence.

Use Case 3, Users Sharing I/O User Devices
(Physical Resources, UI Capabilities)

The third use case is directed to a scenario where two or more users are located in a physical area having a number of I/O user devices with combined UI capabilities that are insufficient to satisfy the UI requirements needed to support time overlapping communication sessions without sharing of some of the I/O user devices by the two users. In this case, both users' ID entities, i.e. UserTags will be detected in the proximity of some I/O user devices which the IODH then associates to the users' respective user terminal emulation applications 110.

Figure 6:
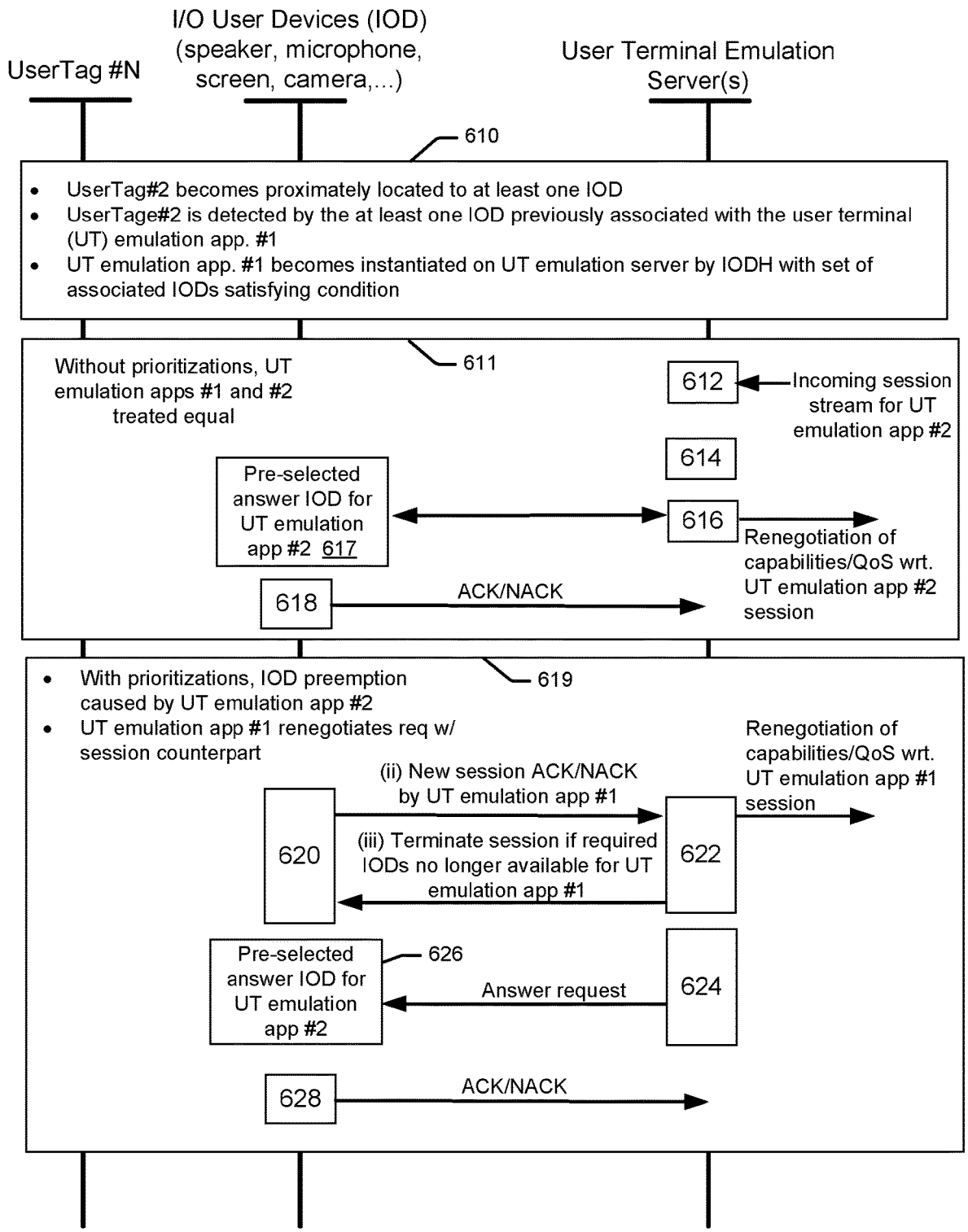

In the illustration of FIG. 6, user terminal emulation application #1 is already handling an ongoing communication session in which some of the associated I/O user devices are allocated and in use by a first user corresponding to UserTag #1; this means the example starts after block 430 in FIG. 4. At that point in time, another second user carrying UserTag#2 enters the physical area.

In block 610 the UserTag#2 becomes proximately located to at least one of the I/O user devices being presently utilized by user terminal emulation application #1. The at least one of the I/O user devices detects UserTag#2. The user terminal emulation application #2 is responsibly instantiated on the user terminal emulation server 100 by the IODH.

In block 612, a request for a new communication session is received which is intended for the user terminal emulation application #2. In block 614 the IODH considers priorities among the user terminal immolation applications have been instantiated. The IODH compares subscriptions of currently hosted (ongoing) user terminal emulation application #1 sessions to those of the new incoming request for a communication session towards the user terminal emulation application #2.

If a prioritization is not identified, the user terminal emulation applications are treated equally so that available I/O user devices with their UI capabilities are allocated on a first-come-first-served manner In contrast, if a prioritization is identified, the IODH operates to: assign a priority to certain I/O user devices for the user terminal emulation application having the highest priority according to defined QoS/capability prioritization rules; with certain UI capabilities present at certain types of I/O user devices, some UI capabilities are operationally shared between the first and second users (e.g., a sufficiently large display screen can be split in half with the halves respectively assigned to the first and second users).

In the present scenario, the user terminal emulation applications #1 and #2 are treated equally without prioritization, which applies to all operations within reference block 611.

In block 616 the IODH assesses the request to capabilities of the second user and user terminal emulation application #2 (considering prioritization's established in the previous step, if any). If the incoming request is not supported (e.g., there are no available or insufficient available I/O user devices determined (via query 617 to I/O user devices) to satisfy the required UI capabilities) by the user terminal emulation application #2 irrespective of any priorities, the IODH may operate to negotiate UI capabilities/QoS with the network entity which sent the session request for the second user, or may determine whether a remote set of I/O user devices satisfy the future proximity rule and the combined capability rule such as according to the example operations described below with regard to FIGS. 9-12. In contrast, if the incoming request is supported by the UI capabilities provided by the user device emulation application #2 for the requested communication session, as determined by the user terminal emulation application #2 querying 618 the available I/O user devices, then an ACK is communicated to the network entity 150.

If the incoming communication request can be supported by the user terminal emulation application #2 when granted some priority for use of one or more of the I/O user devices being presently used by the user terminal emulation application #1, the operations of block 619 can be performed to preempt or cause sharing of the one or more of the I/O user devices that are presently being used by the user terminal emulation application #1. The IODH and/or the user terminal emulation application #1 may then renegotiate 622 with the network entity 150 the required UI capabilities of the communication session of the user terminal emulation application #1 for the first user. The user terminal emulation application #1 may receive a session ACK/NACK generated 620 by the one or more of the preempted or shared I/O user devices with the user terminal emulation application #2 indicating what UI capabilities are available for use by the user terminal emulation application #1, and may responsively terminate the existing communication session if the required UI capability provided by the I/O user devices is no longer sufficient for use by the user terminal emulation application #1 for the communication session.

In block 624, the user terminal emulation application #2 queries the second user through a preselected one of the I/O user devices for whether the requested communication session is accepted. The preselected one of I/O user devices may display 626 a prompt querying the second user for an answer, which is provided 628 as an ACK/NACK to the user terminal emulation application #2. When the second user accepts the communication session (ACK), a communication service is established between the second user and a remote user terminal through the user terminal emulation application #2 and the network entity 150.

An I/O user device presence monitor may operate as a function of the IODH to monitor (continuously, periodically, or responsive to occurrence of a defined event) an ongoing communication session to ensure that all UI capabilities provided by the set of I/O user devices remains proximately located and operationally available to the user.

Exchange of messages between the different system entities can be carried out using the Session Initiation Protocol (SIP) with the Session Description Protocol (SDP) with possible some minor changes regarding the current supported methods in the protocols and media formats. Using SIP/SDP may be advantageous as the connections between the I/O user devices and user terminal emulation applications can be a SIP session which may set up in a manner similar to that between two VoIP clients.

More generally, the operations performed by the user terminal emulation server can include receiving another communication request from the network entity for establishing another communication service between another user and another requesting user terminal. Responsive to the another communication request, the operations determine whether another set of I/O user devices among the I/O user devices identified by the database are determined to be proximately located to a location of the another user and available for use for the another communication service and are further determined, based on the UI capabilities identified by the database for the another set of I/O user devices, to satisfy the combined capability rule for being combinable to provide a combined I/O UI for the another user to interface with another user terminal emulation application to provide the another communication service. Based on determining that no other set of I/O user devices is determined to satisfy the combined capability rule, available for use by the another communication service, and proximately located to the location of the another user, the operations responsively configure one of the I/O user devices in the set of I/O user devices that is proximately located to the another user but is currently being used by the user, to operate to provide a shared UI that is used by the user while the communication service is continuing to be provided to the user and that is further used by the another user while the another communication service is provided to the another user.

In one example, information that is directed to the user can be routed for display in one half of a screen of the display device, and information that is directed to the other user can be routed for display in the other half of the screen of the display device. In another example, a keyboard can be shared by two users who identify themselves via the keyboard (e.g., by typing a user ID, scanning the UserTag, biometric scan, etc.) at the time they are entering information, so that the server can selectively route the keyboard entries to the correct one of the two user terminal emulation applications.

Use Case 4, Responding to Changed Availability of I/O User Devices

I/O user devices can be moving such that over time the set of I/O user devices that are proximately located to the UserTag changes. Moreover, such changes may be caused by one or more of I/O user devices becoming non-operational (e.g., loss of power) or when the radio air interface there between becomes obstructed or is subjected to excessive radio interference. The IODH can be configured to dynamically determine which of the I/O user devices remains available for association with the UserTag.

In one embodiment, mobility aspects are monitored by the I/O user device presence monitor (IODPM) located in the IODH, as illustrated in block 428 in FIG. 4 and block 534 in FIG. 5. When the IODPM discovers that a current user terminal emulation application (i.e. implicitly some of the I/O user devices it utilizes) no longer has access to a sufficient UI capability through the set of I/O user devices, e.g., which may result in violating a QoS contract for the present communication session, the IODPM can trigger re-negotiation of the UI capability requirements for the communication session through the network entity 150 and possibly with the remote user terminal.

The user terminal emulation server may determine that the user needs to move to another location, referred to as a future location, at which a sufficient set of I/O user devices (referred to as remote set of I/O user devices) is determined to be available that are combinable to satisfy the combined capability rule. The server may then provide guidance to the user for traveling to the other location and, upon arrival at the future location, provide the communication service through the remote set of I/O user devices. For example, the user terminal emulation server can: determine whether a remote set of I/O user devices among the I/O user devices identified by the database 120 satisfy a future proximity rule by being proximately located to a future location of the user and to satisfy the combined capability rule for being combinable to provide a combined I/O user interface for the user to interface with the user terminal emulation application to provide the communication service as determined based on the UI capabilities identified by the database 120 for the remote set of I/O user devices and based on content of the communication request; and when the remote set of I/O user devices satisfies the rules the server can also responsively provide the communication service using the remote set of I/O user devices and provide related guidance to the user for using the service. Example operations that can be performed by elements of the system to determine whether a remote set of I/O user devices satisfies the future proximity rule and the combined capability rule, and to responsively provide the communication service using the remote set of I/O user devices and provide related guidance to the user for using the service are described below with regard to FIGS. 9-12.

Using I/O User Devices that are Remotely Located to a User to Establish a Communication Service In nearly all of the operational scenarios above the user terminal emulation server was successful at identifying a local set of I/O user devices that both satisfied a present proximity rule by being proximately located to a present location of the user and further satisfied a combined capability rule for being combinable to provide a combined I/O user interface for the user to interface with the user terminal emulation application to provide the communication service with the network entity. The user terminal emulation server therefore was able to establish the communication service between the network entity and the user using that local set of I/O user devices.

However, other scenarios will arise where the user terminal emulation server will not be able to identify a local set of I/O user devices that satisfies the present proximity rule and the combined capability rule. In one such example scenario, when the user is moving or will be moving soon, the user terminal emulation server can be configured to look for a remotely located set of I/O user devices ("remote set of I/O user devices") that are proximate to a future location of the user and that satisfy the combined capability rule for providing the communication service. The future location may correspond to a location that the user is already traveling toward based on direction and/or a calendar meeting location, or may be a location that the user terminal emulation server suggests and provides guidance to the user for traveling to obtain access to the communication service through the remote set of I/O user devices. In another such example scenario, when the user terminal emulation server fails to identify a sufficient set of I/O user devices that are proximately located to a present user location that also satisfy the combined capability rule, the user terminal emulation server can be configured to look for a remotely located set of I/O user devices that are proximate to a candidate future location of the user and that satisfy the combined capability rule for providing the communication service. Again, the user terminal emulation server may help guide the user to the future location and then establish the communication service between the network entity and the user using that remote set of I/O user devices.

Figure 9:
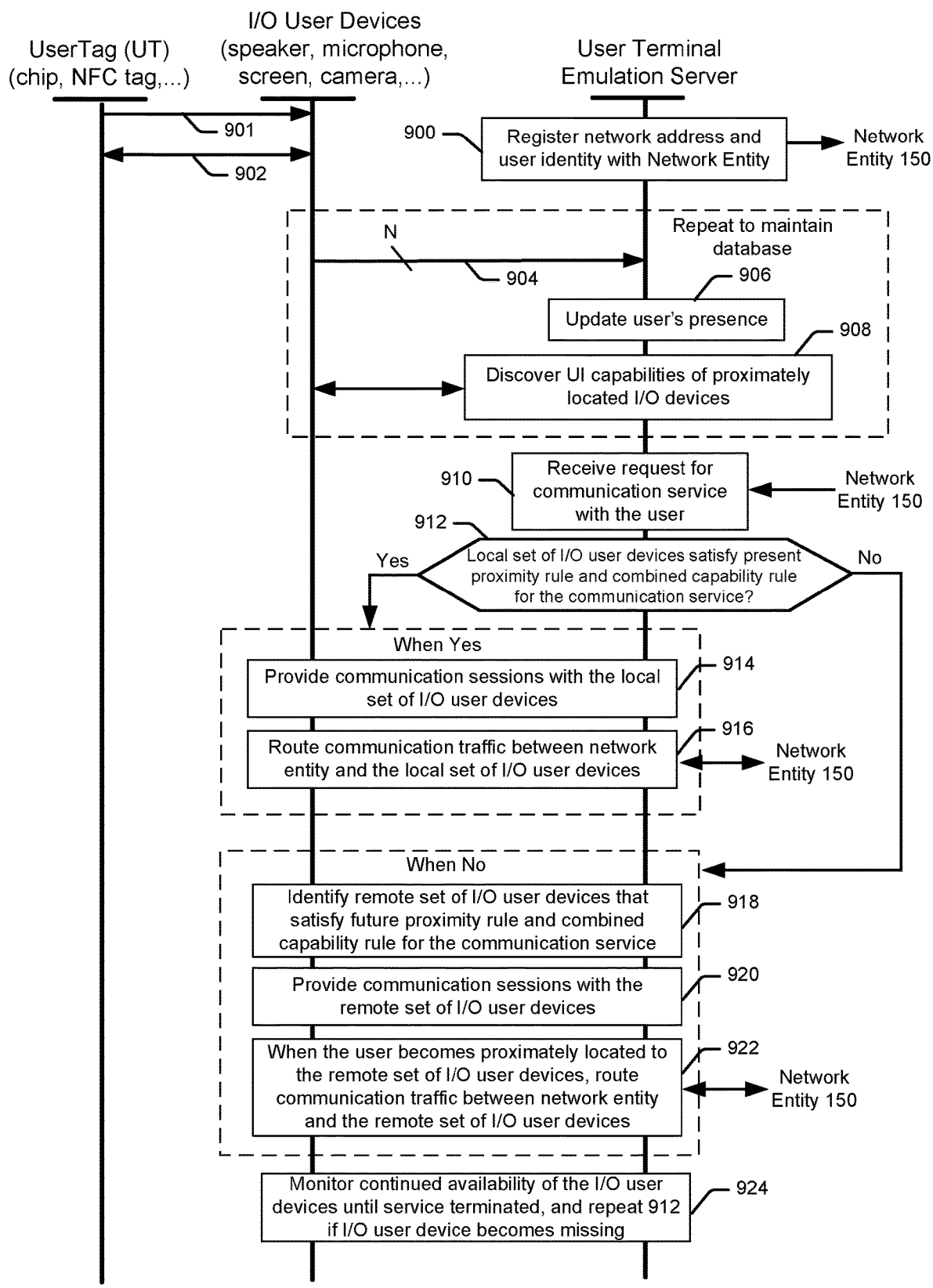
FIG. 9 is a flowchart of operations that performed by a UserTag, I/O user devices, and a user terminal emulation server to establish a communication service that is initiated by a network entity for connection to a user and further illustrates related data flows between these elements in accordance with some embodiments of the present disclosure.

FIG. 9 is a flowchart of operations that are performed by a UserTag, I/O user devices, and a user terminal emulation server to establish a communication service that is initiated by a network entity for connection to a user and further illustrates related data flows between these elements in accordance with some embodiments of the present disclosure.

The operations of FIG. 9 may be particularly useful for a scenario when a user is traveling so that the I/O user devices that initially detected the user's presence will not be proximately located to the user when the communication service would be established or for a sufficient duration after establishment. These operations can also be useful for another scenario in which the user is presently located where there is not a sufficient set of I/O user devices to satisfy the proximity rule and the combined capability rule. In the scenarios, the user terminal emulation server can identify a remote set of I/O user devices that satisfies the proximity rule for a future location of the user and the combined capability rule. The future location may, for example, be a location in a direction that the user is determined to be traveling, be a location along a route determined based on a calendared meeting location contained in a user calendar application, and/or be another location where the user terminal emulation server has identified a remote set of I/O user devices that satisfies the rules and where the user may travel to participate in a communication service.

Referring to FIG. 9, the user terminal emulation server and the network entity 150 perform operations to register 900 a user identifier and a network address in a database. The user identifier may be a UserTag identifier. The user terminal application can be logically associated with the user identifier in the database during a user registration process or as part of another registration process. For example, during a user registration process a user may obtain an account login identifier (serving as the user identifier) that is registered in the database as being associated with a UserTag identifier for a physical UserTag that has been provided to (e.g., purchased by) the user and being associated with a user terminal application that emulates a user terminal having defined capabilities (e.g., a cell phone providing cellular and over-the-type voice-over-IP communication services).

The physical UserTag being transported by the user enters a room and signals 901 its presence to any proximately located and capable-to-receive I/O user device in the room using, e.g., a discovery beacon signal. Alternatively, one or more of the I/O user devices determines presence of the UserTag by polling 902, such as by periodically transmitting discover beacon signals that trigger responsive signaling by the UserTag, or otherwise sensing the UserTag. The I/O user devices that receive signaling indicating presence of the UserTag report 904 to the user terminal emulation server along with a network address of the I/O user device (e.g., IP address, port number, MAC address, FQDN, etc.). The user terminal emulation application corresponding to the specific user (i.e., the UserTag) is updated 906 with respect to the detected user's presence. The user terminal emulation application may operate to receive the notifications from the I/O user devices proximately located to the UserTag. Further UI capability discovery (synchronization) communications are performed between the user terminal emulation server and the I/O user devices. The user terminal emulation server may communicate with the I/O user devices to discover 908 their geographic locations (or which may be identified during an earlier registration process), UI capabilities (e.g., speakers yes/no, display yes/no, microphone yes/no, keyboard yes/no, etc.), and/or availability for use in communication services. The user terminal emulation server can maintain the database that identifies network addresses of I/O user devices, UI capabilities of the I/O user devices, and locations of the I/O user devices, based on content of received messages.

The user terminal emulation server receives 910 an incoming communication request for a communication service (e.g., video call) from the network entity 150 which is directed to the user (UserTag). The user terminal emulation server determines 912 whether a local set of I/O user devices among the I/O user devices identified by the database satisfy a present proximity rule by being proximately located to a present location of the user and to satisfy a combined capability rule for being combinable to provide a combined I/O user interface for the user to interface with the user terminal emulation application to provide the communication service as determined based on the UI capabilities identified by the database for the local set of I/O user devices and based on content of the communication request.

When a local set of I/O user devices is determined 912 to satisfy the present proximity rule and the combined capability rule, the user terminal emulation server provides 914 communication sessions between the user terminal emulation application and the local set of I/O user devices and between the user terminal emulation application and the network entity 150. The user terminal emulation server then routes 916 communication traffic that is received from at least one of the I/O user devices in the local set toward the network entity 150 for the communication service. Moreover, for each data type that is received as communication traffic from the network entity 150, the user terminal emulation server selects 916 one of the I/O user devices from among the remote set of I/O user devices based on matching characteristics of the data type to the UI capabilities identified by the database for the one of the I/O user devices, and then routes 916 the data of the data type toward the network address of the selected one of the I/O user devices. Accordingly, the user terminal emulation server may route communication traffic, including splitting downlink traffic and combining various uplink traffic, using any one or more of the operations and embodiments described above.

In sharp contrast, when no local set of I/O user devices is determined 912 to satisfy the present proximity rule and to satisfy the combined capability rule, the user terminal emulation server further identifies 918 whether a remote set of I/O user devices among the I/O user devices identified by the database satisfy a future proximity rule by being proximately located to a future location of the user and to satisfy the combined capability rule for being combinable to provide a combined I/O user interface for the user to interface with the user terminal emulation application to provide the communication service determined as determined based on the UI capabilities identified by the database for the remote set of I/O user devices and based on content of the communication request.

Based on determining 918 that a remote set of I/O user devices satisfies the future proximity rule and satisfies the combined capability rule, the user terminal emulation server provides 920 communication sessions between the user terminal emulation application and the remote set of I/O user devices and between the user terminal emulation application and the network entity 150. When the user becomes proximately located to the remote set of I/O user devices, the user terminal emulation server routes 922 communication traffic that is received from at least one of the I/O user devices in the remote set toward the network entity 150 for the communication service. Moreover, for each data type that is received as communication traffic from the network entity 150, the user terminal emulation server selects 922 one of the I/O user devices from among the remote set of I/O user devices based on matching characteristics of the data type to the UI capabilities identified by the database for the one of the I/O user devices, and then routes 922 the data of the data type toward the network address of the selected one of the I/O user devices. Accordingly, the user terminal emulation server may route communication traffic, including splitting downlink traffic and combining various uplink traffic, using any one or more of the operations and embodiments described above.

The user terminal emulation server may perform operations to continuously monitor 924 presence of the I/O user devices in the remote set to determine when one or more of the I/O user devices is no longer proximately located to the user such that it can no longer be included as part of the combined UI used during the ongoing communication session. The user terminal emulation server may substitute the UI capability of another I/O user device to the remote set being used by the user for the ongoing communication session responsive to a previous member of the remote set no longer having required presence.

These and other related operations that can be performed by a user terminal emulation server are now described more generally with regard to FIG. 9, and which are configured according to some embodiments. FIG. 9 is a flowchart of operations that can be performed by the user terminal emulation server to identify and use a remote set of I/O user devices when the user is moving or is planning to move such that a presently local set of I/O user devices should be used to establish communication service for the user.

Figure 10:
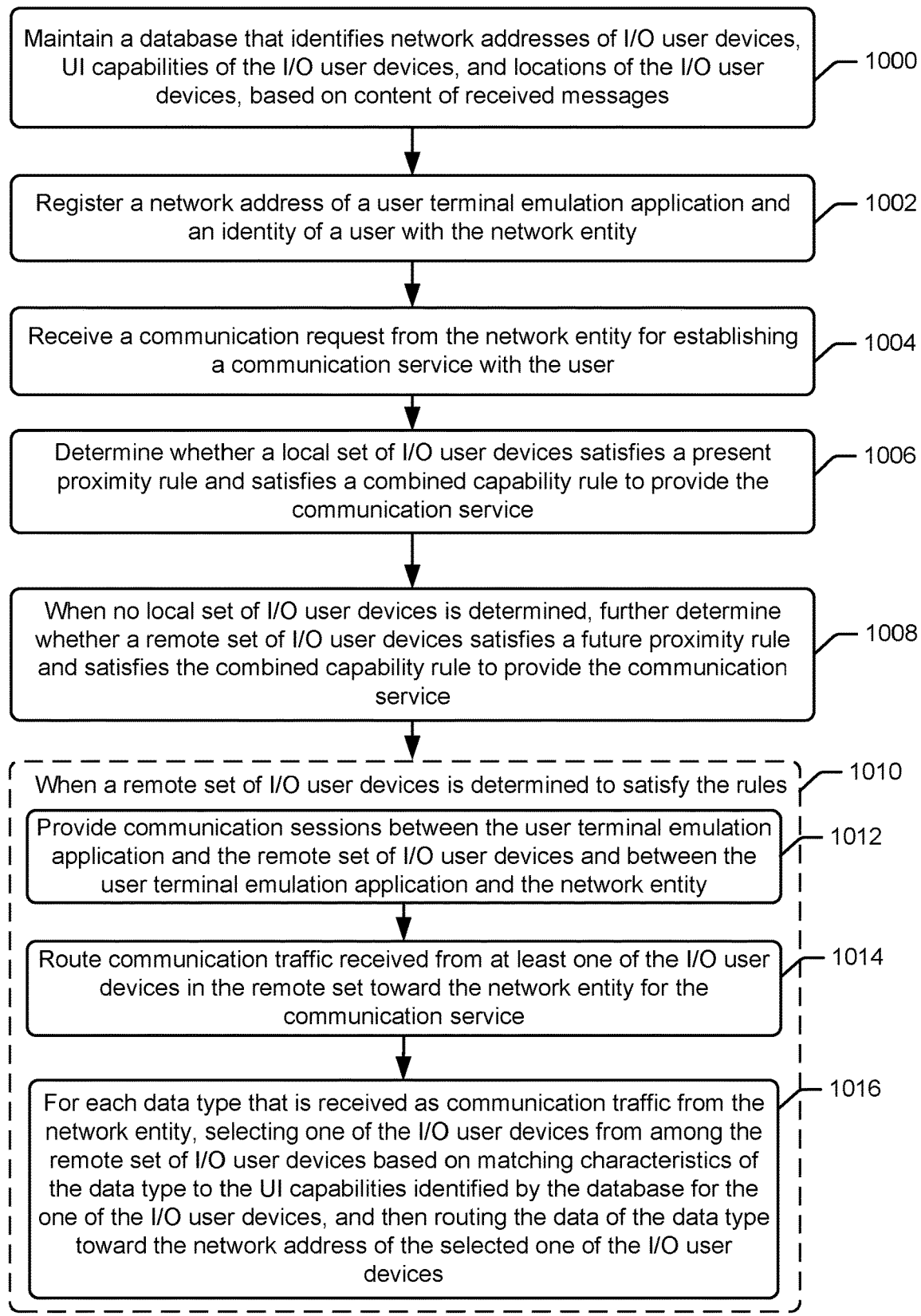
FIGS. 10-12 are flowcharts of operations that may be performed by a user terminal emulation server to provide a communication service through a set of I/O user devices in accordance with some embodiments of the present disclosure.

Referring to FIG. 10, a database is maintained 1000 that identifies network addresses of I/O user devices, UI capabilities of the I/O user devices, and locations of the I/O user devices, based on content of received messages. Registration operations 1002 are performed for a network address of a user terminal emulation application and an identity of a user with a network entity providing communication services, the user terminal emulation application being executed by the user terminal emulation server. A communication request is received 1004 from the network entity for establishing a communication service with the user.

Responsive to the communication request, a determination 1006 is performed whether a local set of I/O user devices among the I/O user devices identified by the database satisfy a present proximity rule by being proximately located to a present location of the user and to satisfy a combined capability rule for being combinable to provide a combined I/O user interface for the user to interface with the user terminal emulation application to provide the communication service as determined based on the UI capabilities identified by the database for the local set of I/O user devices and based on content of the communication request. When no local set of I/O user devices is determined 1006 to satisfy the present proximity rule and to satisfy the combined capability rule, a further determination 1008 is performed whether a remote set of I/O user devices among the I/O user devices identified by the database satisfy a future proximity rule by being proximately located to a future location of the user and to satisfy the combined capability rule for being combinable to provide a combined I/O user interface for the user to interface with the user terminal emulation application to provide the communication service determined as determined based on the UI capabilities identified by the database for the remote set of I/O user devices and based on content of the communication request.

When a remote set of I/O user devices is determined 1008 to satisfy the future proximity rule and to satisfy the combined capability rule, further operations 1010 are performed that include providing 1012 communication sessions between the user terminal emulation application and the remote set of I/O user devices and between the user terminal emulation application and the network entity. The operations also route 1014 communication traffic that is received from at least one of the I/O user devices in the remote set toward the network entity for the communication service. For each data type that is received as communication traffic from the network entity, the operations select 1016 one of the I/O user devices from among the remote set of I/O user devices based on matching characteristics of the data type to the UI capabilities identified by the database for the one of the I/O user devices, and then routing the data of the data type toward the network address of the selected one of the I/O user devices. Accordingly, the user terminal emulation server may route communication traffic, including splitting downlink traffic and combining various uplink traffic, using any one or more of the operations and embodiments described above.

In one embodiment, the operation to determine 1008 whether a remote set of I/O user devices satisfies the future proximity rule and the combined capability rule, includes determining whether the user is traveling. Responsive to when the user is traveling, the operations determine a direction of travel, and determine a projected travel path of the user based on the direction of travel. The user terminal emulation server then prioritizes identification of the remote set of I/O user devices, among the I/O user devices identified by the database, that satisfies the future proximity rule by being proximately located to the future location along the projected travel path and that satisfies the combined capability rule.

The user's direction of travel may be determined by the user terminal emulation server, e.g., by the IODH, based on positioning information provided by a radio communication network (e.g., system assisted positioning) and/or by satellite global positioning system (GPS, GLONASS, etc.). The user's direction of travel may be determined by the user terminal emulation server based on information obtained from one or more user applications that are executed by a user terminal (e.g., user equipment (UE), smartphone, tablet computer, laptop computer, desktop computer, etc.) or another system element (e.g., networked server). The user's direction of travel may be determined based on a direction along which a plurality of I/O user devices sequentially report sensing proximity of the UserTag. For example, the user terminal emulation server can determine the user's direction of along a building corridor responsive to receiving reports from I/O user devices spaced apart along the corridor which report the transitory presence of the UserTag as the user walks past the respective I/O user devices. The speed of the user may be predicted based on: 1) knowledge of distances between the I/O user devices and elapsed time between their sequential reporting of arrival presence of the UserTag; and/or 2) knowledge of the distance between where a particular I/O user device can first sense arrival presence of the UserTag and where the particular I/O user device would detect departure of the UserTag (e.g., loss of signal from UserTag), and the elapsed time between the arrival and departure. The direction and/or speed of travel of the user may be determined using a map application, e.g., Google maps, to determine the user's direction and/or speed based on tracked locations of the UserTag or user terminal (e.g., along a road, railway, biking path, etc.), which may be performed even when the user is not using the map application for route planning.

For example, the operation by the user terminal emulation server to determine 1008 whether a remote set of I/O user devices satisfies the future proximity rule and the combined capability rule, can include determining whether the user is traveling and, when traveling, obtaining from a route planner a predicted route that the user is traveling. The user terminal emulation server can then prioritize identification of the remote set of I/O user devices, among the I/O user devices identified by the database, that satisfies the future proximity rule by being proximately located to the future location along the predicted route and that satisfies the combined capability rule.

These operations may include performing machine learning to update a historical route data structure to store information identifying machine tracked routes traveled by the user over time. The operation to obtain from the route planner the predicted route that the user is traveling, can include accessing the historical route data structure to obtain the predicted route using at least one of: time of day; day of week; the location of the user; and calendared meeting location contained in a user calendar application. The machine learning may be performed by the user terminal emulation server, a user application (e.g., hosted on a user terminal), and/or by another element of the system.

Once the user terminal emulation server has identified a remote set of I/O user devices that satisfy the combined capability rule, the user can be provided guidance for traveling from the user's present location to a future location that is proximately located to the remote set of I/O user devices. The guidance may include, for example, turn-by-turn navigation instructions, a map illustrating the user's present location and the location of the off-route set of I/O user devices, and arrow pointing toward the location of the off-route set of I/O user devices, etc.

The user terminal emulation server may identify a candidate sets of remote I/O user devices, and display information that enables the user to select one of the candidate sets to which the user will travel to access the communication service. For example, a map may be displayed to the user that illustrates the user's present location and the relative other locations of the candidate sets of remote I/O user devices. The user may thereby select one of the candidate sets based on a shortest travel time and/or shortest distance. Alternatively, the user terminal emulation server may recommend that the user select a particular one of the candidate sets based on, for example, a shortest travel route, fastest travel route, and/or greatest fulfillment of the combined capability rule based on the UI capabilities of the I/O user devices in the candidate set. The user terminal emulation server may indicate what UI capabilities are provided by which of the candidate sets, so that the user can choose among them based on what UI capabilities the user desires to use during the communication service (e.g., video and audio, audio only, text input and output, etc.).

The user terminal emulation server may provide feedback through the network entity 150 regarding when the user is estimated to be available to participate in a requested communication service. Alternatively or additionally, the user terminal emulation server may provide the user with an estimate of when the user will reach the future location and be able to participate in the requested communication service.

Figure 11:
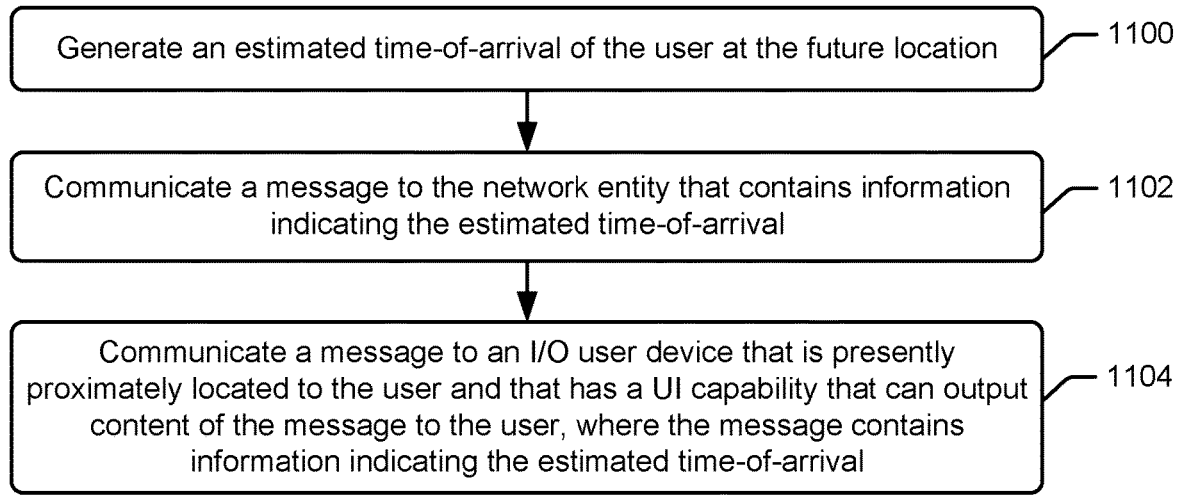

Example operations are shown in the flowchart of FIG. 11. Referring to FIG. 11, the user terminal emulation server generates 1100 an estimated time-of-arrival of the user at the future location, and communicates 1102 a message to the network entity that contains information indicating the estimated time-of-arrival.

The user terminal emulation server may additionally or alternatively generate 1100 an estimated time-of-arrival of the user at the future location, and communicate 1104 a message to an I/O user device that is presently proximately located to the user and that has a UI capability that can output content of the message to the user, wherein the message contains information indicating the estimated time-of-arrival.

The user terminal emulation server responds to a determination that no remote set of I/O user devices is identified that satisfies the future proximity rule by being proximately located to the future location along the predicted route and that satisfies the combined capability rule, by performing further operations to identify an off-route set of I/O user devices and help navigate the user to that off-route set for use in performing the communication service. The corresponding operations can include determining whether an off-route set of I/O user devices among the I/O user devices identified by the database satisfies an off-route future proximity rule by being proximately located to an off-route location within a threshold distance from a segment of the predicted route and that satisfies the combined capability rule.

When the off-route set of I/O user devices is determined to satisfy the off-route future proximity rule and the combined capability rule, the user terminal emulation server can initiate generation of an alternative route (e.g., through a local route planning application and/or through a network route planner such as a Google Maps or Apple Maps application programming interface). The user terminal emulation server can then provide guidance (e.g., turn-by-turn navigation instructions, a map illustrating the user's present location and the location of the off-route set of I/O user devices, and arrow pointing toward the location of the off-route set of I/O user devices, etc.) to the user for navigating along the alternative route to the off-route set of I/O user devices, and reserving the off-route set of I/O user devices for use by the user for the communication service. Based on determining that the user has become proximately located to the off-route set of I/O user devices, the user terminal emulation server can responsively provide communication sessions between the user terminal emulation application and the off-route set of I/O user devices and between the user terminal emulation application and the network entity, and route communication traffic that is received from at least one of the I/O user devices in the off-route set toward the network entity for the communication service. Accordingly, the user terminal emulation server may route communication traffic, including splitting downlink traffic and combining various uplink traffic, using any one or more of the operations and embodiments described above.

The user terminal emulation server may be configured to control movement of I/O user devices to travel to a location where they can be used for a communication service. In one embodiment, the operation to determine 1008 whether a remote set of I/O user devices satisfies the future proximity rule and the combined capability rule, can include identifying a remote operated vehicle transporting an I/O user device that can be relocated to the future location of the user to satisfy the future proximity rule and that has a UI capability that is combinable with a UI capability of at least one other I/O user device to satisfy the combined capability rule, and where the at least one other I/O user device is determined to also satisfy the future proximity rule. The user terminal emulation server can then control the remote operated vehicle to move to a new location that satisfies the future proximity rule, and include the remote operated vehicle and the at least one other I/O user device in the remote set of I/O user devices to provide 1012 the communication service to the user.

For example, the user terminal emulation server may determine that a microphone but not a camera is available at a particular location for use in a video call that requires both audio and video capability. The user terminal emulation server can then determine that an unmanned aerial vehicle (UAV) having a camera UI capability can be relocated to the particular location, and responsive control the unmanned aerial vehicle to relocate. The control operations may correspond to transmitting a command containing the particular location to an unmanned aerial vehicle management module or to the unmanned aerial vehicle to initiate movement, or may correspond to providing more real-time guidance while the unmanned aerial vehicle flies to the particular location.

When the user terminal emulation server is determining 1008 (FIG. 10) whether a remote set of I/O user devices satisfies the future proximity rule and the combined capability rule, it may direct one or more resources toward the present or future location of the user. The resources can correspond to a directional microphone, a video camera having a field-of-view, or a movable resource, such as the above-described unmanned aerial vehicle or another vehicle that transports an I/O user device having a UI capability that is combinable with one or more other I/O user devices satisfy the combined to ability rule for the communication service.

In one embodiment, the operation to determine 1008 whether a remote set of I/O user devices satisfies the future proximity rule and the combined capability rule, can include selecting a camera having a field-of-view that is directionally steerable toward the future location satisfying the future proximity rule and where the camera has a UI capability that is combinable with a UI capability of at least one other I/O user device to satisfy the combined capability rule. The camera is included in the set of I/O user devices that is used to provide the communication service. The video signal from the camera may, for example, be used to capture gestures or user mouth movements, which are further machine processed to identify words that are spoken by the user and/or to identify commands being gestured by the user. Machine identified words can be translated to text strings that are indicated toward the network entity 150. Machine identified commands, e.g., based on recognized user gestures, may be used by the user to initiate an outgoing request for a communication service and may be further used to identify the type of requested services (i.e., to initiate a voice call, a voice and video call, a text messaging service, etc.). The user terminal emulation server can control the camera to directionally steer the field-of-view toward the future location, and include the camera in the remote set of I/O user devices that provide the communication service to the user.

In an additional or alternative embodiment, the operation to determine 1008 whether a remote set of I/O user devices satisfies the future proximity rule and the combined capability rule, can include selecting a microphone that has a sensitivity gain is directionally steerable toward the future location satisfying the future proximity rule and where the microphone has a UI capability that is combinable with a UI capability of at least one other I/O user device to satisfy the combined capability rule. The microphone is included in the set of I/O user devices that is used to provide the communication service. The microphone signal from the microphone may, for example, be processed for machine identification of words that are spoken by the user and/or to identify spoken commands Machine identified words can be translated to text strings that are indicated toward the network entity 150. Machine identified spoken commands may be used to initiate an outgoing request for a communication service and may be further used to identify the type of requested services (i.e., to initiate a voice call, a voice and video call, a text messaging service, etc.). The user terminal emulation server can control the microphone to directionally steer the sensitivity gain toward the future location, and include the microphone in the remote set of I/O user devices that provide the communication service to the user.

When the user is traveling along a predefined or observed route, the user terminal emulation server may identify a sequence of sets of I/O user devices that satisfy the proximity rule for being proximately located to various spaced apart locations along the route and that further satisfy the combined capability rule. The user terminal emulation server may move one or more I/O user devices to one or more of the spaced apart locations to supplement one or more UI capabilities that are otherwise missing there.

The user terminal emulation server may track the user's progression along the route and selectively initiate set up of communication sessions between the user terminal emulation server and the soon-to-be-reached next set of I/O user devices as the user approaches their location and then provide the communication service through that next set of I/O user devices as the user arrives. Similarly, the user terminal emulation server may terminate provision of the communication service through a previous set of I/O user devices, e.g., including terminating communication sessions between the user terminal emulation server and the previous set of I/O user devices, as the user departs their location along the route towards the next set of I/O user devices.

The user terminal emulation server may buffer communication traffic from the network entity 150 while the user is in-between the serviceable area of the previous set of I/O user devices in the next set of I/O user devices. When the communication service begins being provided through the next set of I/O user devices, the user terminal emulation server may play out the buffered communication traffic through the next set of I/O user devices. Play out of the buffered communication traffic may be performed at a faster data communication rate then that at which it was buffered, so that the user can receive the buffered communication traffic while also getting caught-up to real-time. For example, when the buffered communication traffic comprises video the user terminal emulation server may stream the video at a higher frame rate so that it appears fast-forwarded so that the user can get caught-up to the real-time video stream being provided through the network entity 150.

Buffering of communication traffic can alternatively or additionally be performed when the user terminal emulation server initially starts providing the communication service through a local set of I/O user devices, but then needs to transfer the ongoing communication service to a remote set of I/O user devices. This scenario may be necessitated when the user is moving or when one of the I/O user devices in the local set is no longer available and the remaining I/O user devices in the local set do not satisfy the combined capability rule for continued use in a degraded UI capability communication session.

Figure 12:
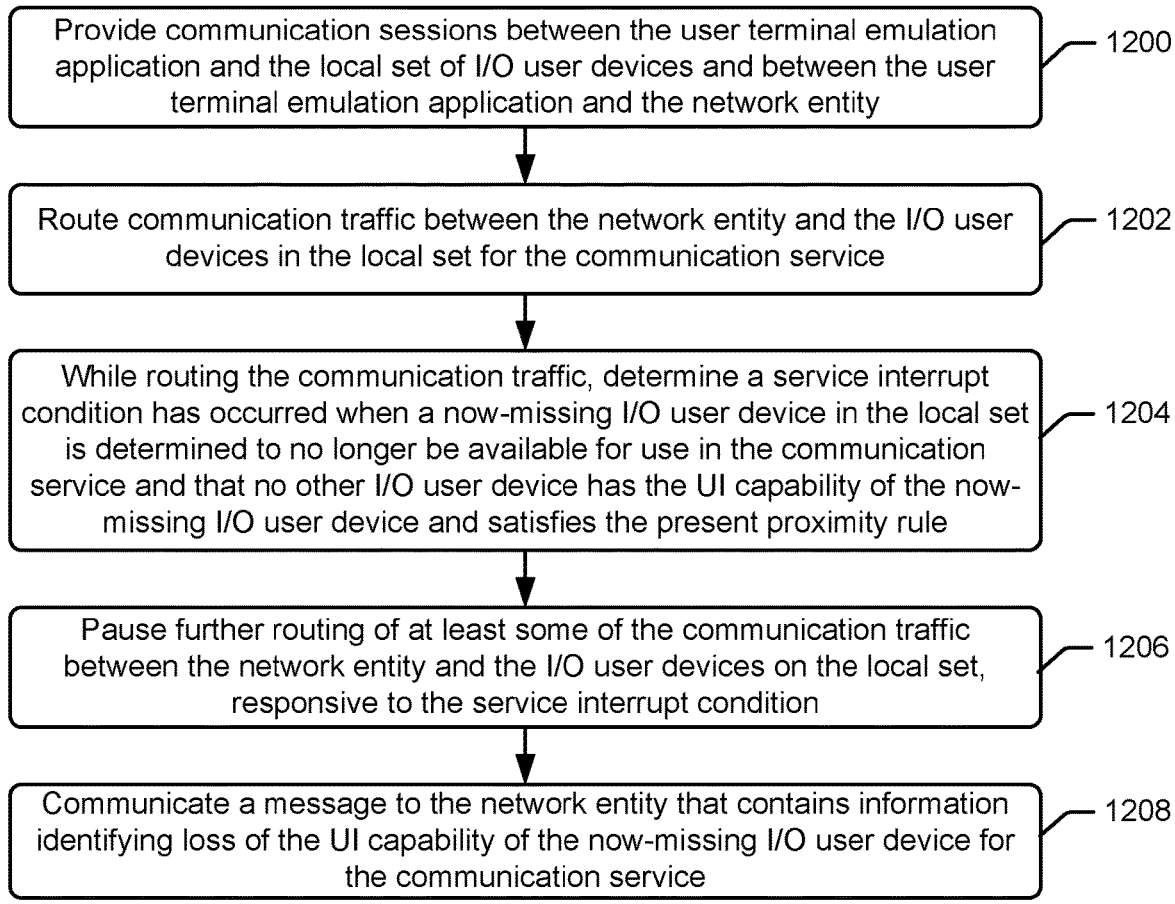

An example embodiment of these operations is explained with reference to the flowchart of FIG. 12 in combination with the flowchart of FIG. 10. Referring to FIGS. 10 and 12, when a local set of I/O user devices is determined 1006 (FIG. 10) to satisfy the present proximity rule and to satisfy the combined capability rule, the user terminal emulation server provides 1200 communication sessions between the user terminal emulation application and the local set of I/O user devices and between the user terminal emulation application and the network entity 150. The user terminal emulation server then routes 1202 communication traffic between the network entity and the I/O user devices in the local set for the communication service. While routing the communication traffic, the user terminal emulation server subsequently determines 1204 that a service interrupt condition has occurred when a now-missing I/O user device in the local set is determined to no longer be available for use in the communication service and that no other I/O user device has the UI capability of the now-missing I/O user device and satisfies the present proximity rule. The user terminal emulation server responsibly pauses 1206 further routing of at least some of the communication traffic between the network entity and the I/O user devices on the local set, responsive to the service interrupt condition, and communicates 1208 a message to the network entity that contains information identifying loss of the UI capability of the now-missing I/O user device for the communication service.

As explained above, loss of a I/O user device in a set can be compensated for by negotiating with the network entity 150 and/or the user a reduced UI capability for performing the ongoing communication service. The user terminal emulation server can negotiate with the network entity 150 a modification to the combined capability rule. Responsive to the negotiation, the user terminal emulation server can determine whether a modified local set of I/O user devices satisfy the present proximity rule and satisfy the modification to the combined capability rule. When the modified local set of I/O user devices satisfies the present proximity rule and the modification to the combined capability rule, the user terminal emulation server can restart further routing of the communication traffic between the network entity and the modified local set of I/O user devices. The negotiation may result in a reduction in the UI capabilities are needed to be provided by the set of I/O user devices to satisfy the combined capability rule for the communication service. For example, the combined capability rule can be modified to require a reduced set of UI capabilities for continuing the communication service between the network entity and the user.

While a user is moving from a previous set of I/O user devices to a future set of I/O user devices while the communication service is being provided, the user terminal emulation server pauses routing of communication traffic of the communication service to prevent loss of the communication traffic while the user is unable to receive that traffic. The user terminal emulation server can be configured to, while the further routing is paused, buffer in memory communication traffic received from the network entity 150 that is to be routed to the now-missing I/O user device. When the modified local set of I/O user devices has a substitute I/O user device with the UI capability of the now-missing I/O user device, and the further routing is restarted, the user terminal emulation server can provide the communication traffic buffered in memory to the substitute I/O user device.

As explained above, the buffered communication traffic may be streamed or otherwise provided at a higher communication rate than which it was received from the network entity that the user can get caught-up to avoid further increase in the amount of communication traffic that is buffered. The higher communication rate may enable the user to get caught-up to real-time, which may be considered a necessary goal for a videoconference communication service. Accordingly, the operation to provide the communication traffic buffered in memory to the substitute I/O user device can include streaming at least at a first data communication rate the communication traffic from the buffer in memory to the substitute I/O user device, and once the buffered communication traffic has been emptied by having been streamed to the substitute I/O user device, further streaming communication traffic presently received from the network entity toward the substitute I/O user device at no greater than a second data communication rate that is lower than the first data communication rate.

While a user is traveling, the user may have continued access to a portable one of the I/O user devices that enables the communication service to continue but with a degraded UI capability. Once the user reaches the next (remote) set of I/O user devices, the portable I/O user device can be included in the next set of I/O user devices that is used to continue to provide the communication service. While the user is traveling, the user terminal emulation server may provide the network entity 150 and/or the user with notification of what UI capability has been maintained for the communication service, and may further provide the network entity and/or the user with an estimate for how long it will take the user to reach the next set of I/O user devices so that an enhanced UI capability is provided for the communication service.

As explained above, when identifying a remote set of I/O user devices it can be used to satisfy the combined capability rule, the user terminal emulation server may configure an I/O user device to be shared by more than one user for more than one communication service. For example, a display device may be configured with a split screen, with one-half of the screen being used by a first user for a first communication service and a second-half of the screen being used by a second user for a second communication service.

Example Scenarios and Use-Cases

When a user transporting a UserTag moves into an area, the user terminal emulation server can seek to identify UI capabilities from various types of, e.g., human-interpretable input/output devices such as microphones, screens, and speakers, or non-human readable (sensor-like) devices such as cameras, lidars, accelerometers, and GNSS input, which may be combinable to provide a combined UI capability that satisfies the combined capability rule for the present or future communication service.

In one scenario, an ongoing communication session between User A (i.e. UserTag A) and User B (i.e. UserTag B) can include a need for vocal communications capabilities, for which the user terminal emulation server seeks to identify microphones, speakers, and/or other 110 user devices that can support such vocal communications capabilities and which are proximately located to the current locations of the users and/or which are proximately located to other candidate future locations of one or more of the users. When User A desires to extend the communication session to include video communications, it may be that User A lacks either a camera and/or a screen. The user terminal emulation server can responsively decide to re-plan an ongoing travel path for User A so that User A later on (or within predefined time) will enter an area where a public camera (stationary camera) will become available, or may control a movable camera (e.g., transported by an unmanned aerial vehicle, a person, a car, a bus, a train, etc.) is carried to the proximity of User A.

In the first user-path re-planning scenario, for example, User A can notified by the user terminal emulation server that a requested UI capability will become available within some distance and/or time along a newly proposed route presented to User A. The user terminal emulation server may also communicate information notifying User B of an estimated time when User A will be available for video communications, e.g., identifying that User A will be available in 30 seconds to join a video call and then providing dynamic updates as User A approaches the camera/screen location (e.g., "remaining time 20 s, 10 s, 5 s, 4 s, 3 s, 2 s, 1 s, . . . on-the-air".

In a second approach where a camera is transported to a location for use by User A, given that addition of the UI capability is not handled by the users themselves but instead by a third part (i.e. UAV), the user terminal emulation server may provide information that notifies both Users A and B with an estimated time of arrival of the additional UI capability for use by User A.

In a further scenario where, e.g., a public camera will become available for User A to use in an ongoing communication service, the user terminal emulation server or a connected route planner can guide User A along a path to a future location where User A will be within the field of view of the public camera. The public camera may, for example, be associated with an I/O user device that is transported by a third person, User C, such as a camera connected to User C's cell phone. The user terminal emulation server may query User C for permission to use the cell phone camera for the communication service that is being provided between User A and User B through the network entity 150. The query may actually be presented to User C for acceptance or denial of permission to use the camera, which can be communicated back to the user terminal emulation server. Alternatively or additionally, the query may be processed by User C's cell phone and/or by a network entity through a rule based on a set of defined user terms and conditions with a responsive acceptance or denial of permission being generated by the cell phone and/or the network entity without User C being directly queried. When permission is granted, the user terminal emulation server can include the camera of User C's cell phone within the set of I/O user devices through which the communication service is provided, and the use of the camera can be terminated when User A is predicted to no longer be within the field of view of the camera and/or when the communication services otherwise terminated. In this manner, User B and be provided a video stream from User C's cell phone camera that shows User A as part of the enhanced UI capability of the ongoing communication service.

Although some embodiments have been described in the context of transporting a camera by vehicle or person, other ways of transporting I/O user devices to the proximity of a user can be envisioned. For example, touchscreen user input interfaces, output speakers, input microphones, fingerprint readers, read in the scanners, biometric sensors, and/or other UI capabilities can be transported to a present user location or to one or more future locations of the user along a route that has been planned by the user or which is suggested to the user by the user terminal emulation server to enable provision of a continuance of a communication service with the user.

Example I/O User Device and User Terminal Emulation Server

Figure 13:
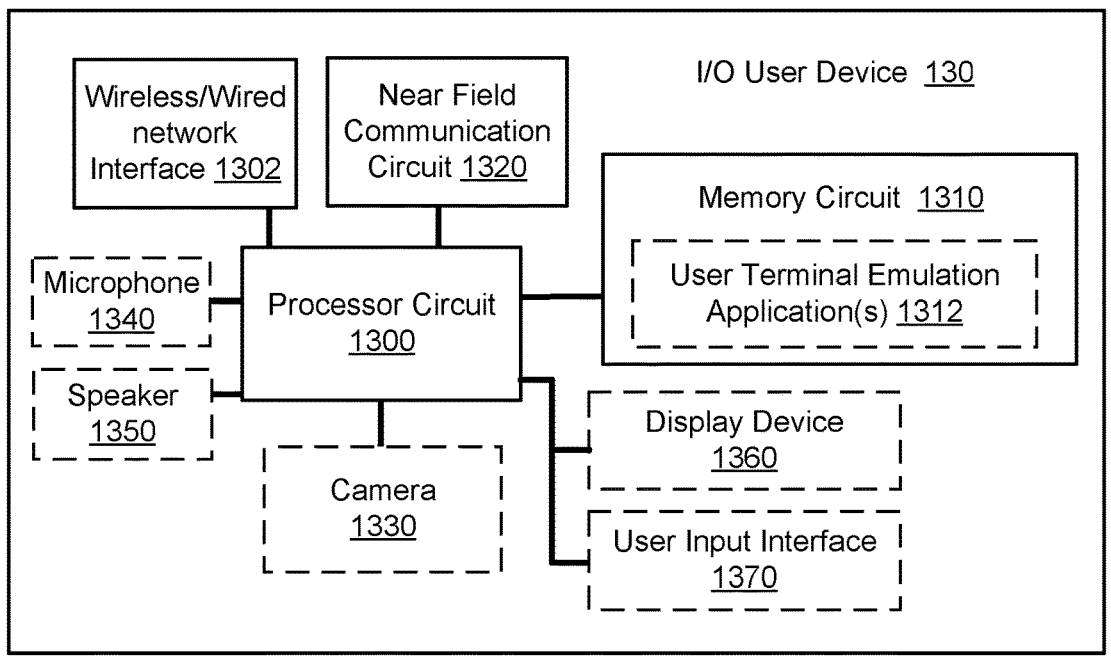
FIG. 13 is a block diagram of hardware circuit components of an I/O user device which are configured to operate in accordance with some embodiments.

FIG. 13 is a block diagram of hardware circuit components of an I/O user device 130 which are configured to operate in accordance with some embodiments. The I/O user device 130 can include a wired/wireless network interface circuit 1302, a near field communication circuit 1320, at least one processor circuit 1300 (processor), and at least one memory circuit 1310 (memory). The processor 1300 is connected to communicate with the other components. The memory 1310 stores program code (e.g., user terminal emulation application(s)) 1312 that is executed by the processor 1300 to perform operations disclosed herein. The processor 1300 may include one or more data processing circuits (e.g., microprocessor and/or digital signal processor), which may be collocated or distributed across one or more data networks. The processor 1300 is configured to execute the program code 1312 in the memory 1310, described below as a non-transitory computer readable medium, to perform some or all of the operations and methods for one or more of the embodiments disclosed herein for a mobile electronic device. The I/O user device 130 can include one or more UI component devices, including without limitation, a microphone 1340, a speaker 1350, a camera 1330, and display device 1360, and a user input interface 1370 (e.g., keyboard, touch screen interface, physical switches, etc.).

Figure 14:
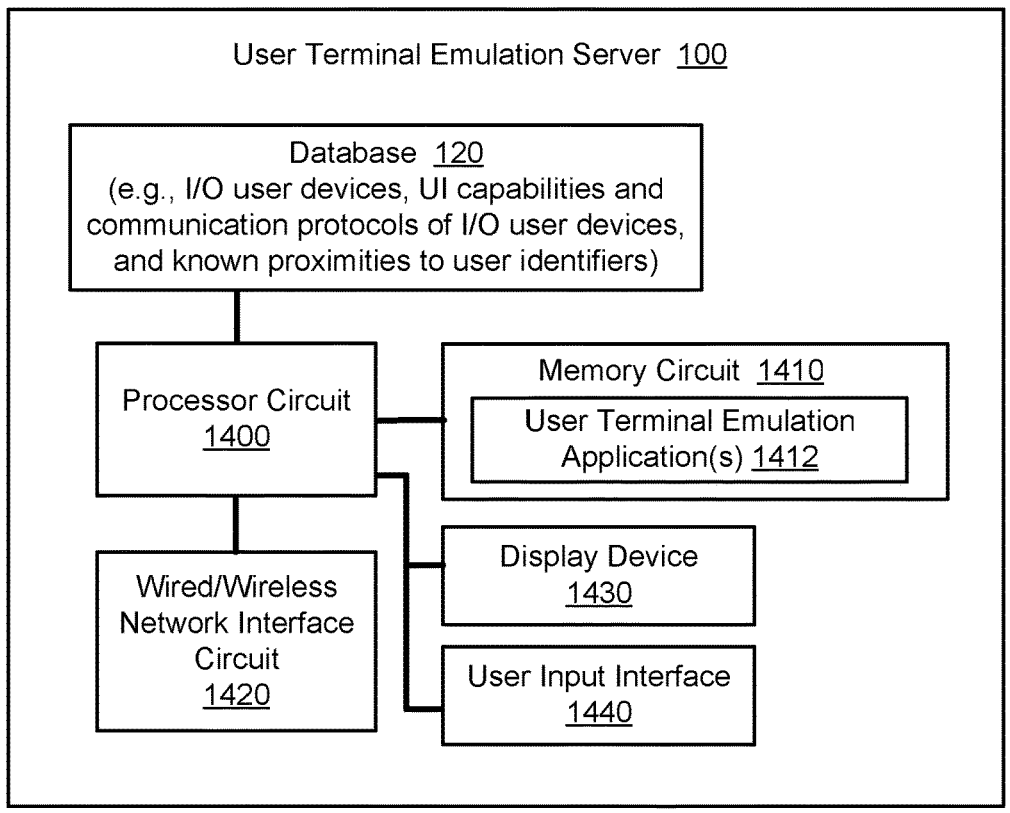
FIG. 14 is a block diagram of hardware circuit components of a user terminal emulation server that are configured to operate in accordance with some embodiments of the present disclosure.

FIG. 14 is a block diagram of hardware circuit components of a user terminal emulation server 100 which are configured to operate in accordance with some embodiments. The user terminal emulation server 100 can include a wired/wireless network interface circuit 1420, a database 120 (e.g., listing I/O user devices, UI capabilities of the I/O user devices, communication protocols used to communicate with the I/O user devices, known proximities to user identifiers, etc.), a display device 1430, a user input interface 1440 (e.g., keyboard, touch screen interface, physical switches, etc.), at least one processor circuit 1400 (processor), and at least one memory circuit 1410 (memory). The processor 1400 is connected to communicate with the other components. The memory 1410 can store the user terminal emulation application 1412 that is executed by the processor 1400 to perform operations disclosed herein. The processor 1400 may include one or more data processing circuits (e.g., microprocessor and/or digital signal processor), which may be collocated or distributed across one or more data networks. The processor 1400 is configured to execute computer program instructions in the memory 1410, described below as a non-transitory computer readable medium, to perform some or all of the operations and methods for one or more of the embodiments disclosed herein for a mobile electronic device.

Cloud Implementation

Some or all operations described above as being performed by the user terminal emulation server 100 or the I/O user devices 130 may alternatively be performed by the other one, and/or by another node that is part of a cloud computing resource. For example, those operations can be performed as a network function that is close to the edge, such as in a cloud server or a cloud resource of a telecommunications network operator, e.g., in a CloudRAN or a core network, and/or may be performed by a cloud server or a cloud resource of a media provider, e.g., iTunes service provider or Spotify service provider.

Abbreviations

3GPP 3rd Generation Partnership Project'
ACK Acknowledgement
App Application, i.e. program
DPM Data Presence Monitor
EC Edge Cloud
eNB Evolved Node B (a.k.a. RBS, Radio Base Station)
GW Gateway (also. acronym for Leif GW Persson)
ICMP Internet Control Message Protocol
IOD Input and/or Output Device
IODH IOD Handler
ITU International Telecommunication Union
NACK Non ACK
NFC Near Field Communication
RTP Real Time Protocol
RTCP Real Time Control Protocol
SDP Session Description Protocol
SIM Subscriber Identity Module
SoftUE Software-defined Smartphone (e.g., UE)
SUE SoftUE
SR Sender Response
UE User equipment
UT User Tag Further Definitions and Embodiments In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A user terminal emulation server for providing communication services using sets of input and/or output (I/O) user devices, the user terminal emulation server comprising:
   at least one processor; and
   at least one memory storing program code that is executable by the at least one processor to perform operations comprising:
      maintaining a database that identifies network addresses of I/O user devices, user interface (UI) capabilities of the I/O user devices, and locations of the I/O user devices, based on content of received messages;
      registering a network address of a user terminal emulation application and an identity of a user with a network entity providing communication services, the user terminal emulation application being executed by the user terminal emulation server;
      receiving a communication request from the network entity for establishing a communication service with the user; and
      responsive to the communication request, determining whether a local set of I/O user devices among the I/O user devices identified by the database satisfy a present proximity rule based on a present location of the user and to satisfy a combined capability rule for being combinable to provide a combined I/O user interface for the user to interface with the user terminal emulation application to provide the communication service as determined based on the UI capabilities identified by the database for the local set of I/O user devices and based on content of the communication request; and when no local set of I/O user devices is determined to satisfy the present proximity rule and to satisfy the combined capability rule, further determining whether a remote set of I/O user devices among the I/O user devices identified by the database satisfy a future proximity rule based on to a future location of the user and to satisfy the combined capability rule for being combinable to provide a combined I/O user interface for the user to interface with the user terminal emulation application to provide the communication service determined as determined based on the UI capabilities identified by the database for the remote set of I/O user devices and based on content of the communication request.

2. The user terminal emulation server of claim 1, based on determining that a remote set of I/O user devices satisfies the future proximity rule and satisfies the combined capability rule, the program code further performs operations comprising:

providing communication sessions between the user terminal emulation application and the remote set of I/O user devices and between the user terminal emulation application and the network entity;

routing communication traffic that is received from at least one of the I/O user devices in the remote set toward the network entity for the communication service; and for each data type that is received as communication traffic from the network entity, selecting one of the I/O user devices from among the remote set of I/O user devices based on matching characteristics of the data type to the UI capabilities identified by the database for the one of the I/O user devices, and then routing the data of the data type toward the network address of the selected one of the I/O user devices.

3. The user terminal emulation server of claim 1, wherein the operations further comprise:

generating an estimated time-of-arrival of the user at the future location; and communicating a message to the network entity that contains information indicating the estimated time-of-arrival.

4. The user terminal emulation server of claim 1, wherein the operations further comprise:

generating an estimated time-of-arrival of the user at the future location; and communicating a message to an I/O user device that is presently proximately located to the user and that has a UI capability that can output content of the message to the user, wherein the message contains information indicating the estimated time-of-arrival.

5. The user terminal emulation server of claim 1, wherein the operation to determine whether a remote set of I/O user devices satisfies the future proximity rule and the combined capability rule, comprises:

determining whether the user is traveling;

responsive to when the user is traveling, determining a direction of travel;

determining a projected travel path of the user based on the direction of travel; and prioritizing identification of the remote set of I/O user devices, among the I/O user devices identified by the database, that satisfies the future proximity rule by being proximately located to the future location along the projected travel path and that satisfies the combined capability rule.

6. The user terminal emulation server of claim 1, wherein the operation to determine whether a remote set of I/O user devices satisfies the future proximity rule and the combined capability rule, comprises:

determining whether the user is traveling;

responsive to when the user is traveling, obtaining from a route planner a predicted route that the user is traveling; and prioritizing identification of the remote set of I/O user devices, among the I/O user devices identified by the database, that satisfies the future proximity rule by being proximately located to the future location along the predicted route and that satisfies the combined capability rule.

7. The user terminal emulation server of claim 6, wherein the operations further comprise:

performing machine learning to update a historical route data structure to store information identifying machine tracked routes traveled by the user over time, wherein the operation to obtain from the route planner the predicted route that the user is traveling, comprises accessing the historical route data structure to obtain the predicted route using at least one of: time of day; day of week; the location of the user; and calendared meeting location contained in a user calendar application.

8. The user terminal emulation server of claim 6, wherein the operations further comprise:

responsive to when no remote set of I/O user devices is identified that satisfies the future proximity rule by being proximately located to the future location along the predicted route and that satisfies the combined capability rule, performing operations to:

determining whether an off-route set of I/O user devices among the I/O user devices identified by the database satisfies an off-route future proximity rule by being proximately located to an off-route location within a threshold distance from a segment of the predicted route and that satisfies the combined capability rule; and when the off-route set of I/O user devices is determined to satisfy the off-route future proximity rule and the combined capability rule, initiating generation of an alternative route, providing guidance to the user for navigating along the alternative route to the off-route set of I/O user devices, and reserving the off-route set of I/O user devices for use by the user for the communication service;

based on determining that the user has become proximately located to the off-route set of I/O user devices, providing communication sessions between the user terminal emulation application and the off-route set of I/O user devices and between the user terminal emulation application and the network entity, and routing communication traffic that is received from at least one of the I/O user devices in the off-route set toward the network entity for the communication service.

9. The user terminal emulation server of claim 1, wherein the operation to determine whether a remote set of I/O user devices satisfies the future proximity rule and the combined capability rule, comprises:

identifying a mobile terminal type of I/O user device registered by another user and which has a location satisfying the future proximity rule and has a UI capability that is combinable with a UI capability of at least one other I/O user device to satisfy the combined capability rule, and where the at least one other I/O user device is determined to also satisfy the future proximity rule;

sending a request to the mobile terminal operated by the other user requesting use of the mobile terminal to provide the communication service for the user; and responsive to receiving an indicated acknowledgement of acceptance of the request to the mobile terminal, including the mobile terminal and the at least one other I/O user device in the remote set of I/O user devices to provide the communication service to the user.

10. The user terminal emulation server of claim 1, wherein the operation to determine whether a remote set of I/O user devices satisfies the future proximity rule and the combined capability rule, comprises:

identifying a remote operated vehicle transporting an I/O user device that can be relocated to the future location of the user to satisfy the future proximity rule and that has a UI capability that is combinable with a UI capability of at least one other I/O user device to satisfy the combined capability rule, and where the at least one other I/O user device is determined to also satisfy the future proximity rule;

controlling the remote operated vehicle to move to a new location that satisfies the future proximity rule; and including the remote operated vehicle and the at least one other I/O user device in the remote set of I/O user devices to provide the communication service to the user.

11. The user terminal emulation server of claim 1, wherein the operation to determine whether a remote set of I/O user devices satisfies the future proximity rule and the combined capability rule, comprises:

selecting at least one of: a camera having a field-of-view that is directionally steerable toward the future location satisfying the future proximity rule and where the camera has a UI capability that is combinable with a UI capability of at least one other I/O user device to satisfy the combined capability rule; and a microphone that has a sensitivity gain that is directionally steerable toward the future location satisfying the future proximity rule and where the microphone has a UI capability that is combinable with a UI capability of at least one other I/O user device to satisfy the combined capability rule;

controlling the selected at least one of: the camera to directionally steer the field-of-view toward the future location; and the microphone to directionally steer the sensitivity gain toward the future location satisfying the future proximity rule; and including the selected at least one of the camera and the microphone in the remote set of I/O user devices to provide the communication service to the user.

12. The user terminal emulation server of claim 1, when a local set of I/O user devices is determined to satisfy the present proximity rule and to satisfy the combined capability rule:

providing communication sessions between the user terminal emulation application and the local set of I/O user devices and between the user terminal emulation application and the network entity;

routing communication traffic between the network entity and the I/O user devices in the local set for the communication service;

while routing the communication traffic, determining a service interrupt condition has occurred when a now-missing I/O user device in the local set is determined to no longer be available for use in the communication service and that no other I/O user device has the UI capability of the now-missing I/O user device and satisfies the present proximity rule;

pausing further routing of at least some of the communication traffic between the network entity and the I/O user devices on the local set, responsive to the service interrupt condition; and communicating a message to the network entity that contains information identifying loss of the UI capability of the now-missing I/O user device for the communication service.

13. The user terminal emulation server of claim 12, wherein the operations further comprise:

negotiating with the network entity a modification to the combined capability rule;

responsive to the negotiation, determining whether a modified local set of I/O user devices satisfy the present proximity rule and satisfy the modification to the combined capability rule;

when the modified local set of I/O user devices satisfies the present proximity rule and the modification to the combined capability rule, restarting further routing of the communication traffic between the network entity and the modified local set of I/O user devices.

14. The user terminal emulation server of claim 13, wherein the combined capability rule requires a reduced set of UI capabilities for continuing the communication service between the network entity and the user.

15. The user terminal emulation server of claim 13, wherein the operations further comprise:

while the further routing is paused, buffering in memory communication traffic received from the network entity that is to be routed to the now-missing I/O user device;

when the modified local set of I/O user devices has a substitute I/O user device with the UI capability of the now-missing I/O user device, and the further routing is restarted, providing the communication traffic buffered in memory to the substitute I/O user device.

16. The user terminal emulation server of claim 15, wherein the operation to provide the communication traffic buffered in memory to the substitute I/O user device comprises streaming at least at a first data communication rate the communication traffic from the buffer in memory to the substitute I/O user device, and once the buffered communication traffic has been emptied by having been streamed to the substitute I/O user device, further streaming communication traffic presently received from the network entity toward the substitute I/O user device at no greater than a second data communication rate that is lower than the first data communication rate.

17. A method by a user terminal emulation server for providing communication services using sets of input and/or output (I/O) user devices, the method comprising:

maintaining a database that identifies network addresses of I/O user devices, user interface (UI) capabilities of the I/O user devices, and locations of the I/O user devices, based on content of received messages;

registering a network address of a user terminal emulation application and an identity of a user with a network entity providing communication services, the user terminal emulation application being executed by the user terminal emulation server;
receiving a communication request from the network entity for establishing a communication service with the user; and
responsive to the communication request, determining whether a local set of I/O user devices among the I/O user devices identified by the database satisfy a present proximity rule based on a present location of the user and to satisfy a combined capability rule for being combinable to provide a combined I/O user interface for the user to interface with the user terminal emulation application to provide the communication service as determined based on the UI capabilities identified by the database for the local set of I/O user devices and based on content of the communication request; and
when no local set of I/O user devices is determined to satisfy the present proximity rule and to satisfy the combined capability rule, further determining whether a remote set of I/O user devices among the I/O user devices identified by the database satisfy a future proximity rule based on a future location of the user and to satisfy the combined capability rule for being combinable to provide a combined I/O user interface for the user to interface with the user terminal emulation application to provide the communication service determined as determined based on the UI capabilities identified by the database for the remote set of I/O user devices and based on content of the communication request.

18. The method of claim 17, based on determining that a remote set of I/O user devices satisfies the future proximity rule and satisfies the combined capability rule, further comprising:
providing communication sessions between the user terminal emulation application and the remote set of I/O user devices and between the user terminal emulation application and the network entity;
routing communication traffic that is received from at least one of the I/O user devices in the remote set toward the network entity for the communication service; and
for each data type that is received as communication traffic from the network entity, selecting one of the I/O user devices from among the remote set of I/O user devices based on matching characteristics of the data type to the UI capabilities identified by the database for the one of the I/O user devices, and then routing the data of the data type toward the network address of the selected one of the I/O user devices.

19. A computer program product comprising a non-transitory computer readable medium storing program code that is executed by at least one processor of a user terminal emulation server for providing communication services using sets of input and/or output (I/O) user devices, the program code when executed by the at least one processor performing operations comprising:
maintaining a database that identifies network addresses of I/O user devices, user interface (UI) capabilities of the I/O user devices, and locations of the I/O user devices, based on content of received messages;
registering a network address of a user terminal emulation application and an identity of a user with a network entity providing communication services, the user terminal emulation application being executed by the user terminal emulation server;
receiving a communication request from the network entity for establishing a communication service with the user; and
responsive to the communication request, determining whether a local set of I/O user devices among the I/O user devices identified by the database satisfy a present proximity rule based on a present location of the user and to satisfy a combined capability rule for being combinable to provide a combined I/O user interface for the user to interface with the user terminal emulation application to provide the communication service as determined based on the UI capabilities identified by the database for the local set of I/O user devices and based on content of the communication request; and
when no local set of I/O user devices is determined to satisfy the present proximity rule and to satisfy the combined capability rule, further determining whether a remote set of I/O user devices among the I/O user devices identified by the database satisfy a future proximity rule based on a future location of the user and to satisfy the combined capability rule for being combinable to provide a combined I/O user interface for the user to interface with the user terminal emulation application to provide the communication service determined as determined based on the UI capabilities identified by the database for the remote set of I/O user devices and based on content of the communication request.

20. The computer program product of claim 19, wherein the program code when executed by the at least one processor to determine whether a remote set of I/O user devices satisfies the future proximity rule and the combined capability rule, performs operations comprising:
determining whether the user is traveling;
responsive to when the user is traveling, obtaining from a route planner a predicted route that the user is traveling; and
prioritizing identification of the remote set of I/O user devices, among the I/O user devices identified by the database, that satisfies the future proximity rule by being proximately located to the future location along the predicted route and that satisfies the combined capability rule.

21. The method of claim 17, wherein the method further comprises:
generating an estimated time-of-arrival of the user at the future location; and
communicating a message to the network entity that contains information indicating the estimated time-of-arrival.

22. The method of claim 17, wherein method further comprises:
generating an estimated time-of-arrival of the user at the future location; and
communicating a message to an I/O user device that is presently proximately located to the user and that has a UI capability that can output content of the message to the user, wherein the message contains information indicating the estimated time-of-arrival.

23. The method of claim 17, wherein the determining whether a remote set of I/O user devices satisfies the future proximity rule and the combined capability rule, comprises:
determining whether the user is traveling;
responsive to when the user is traveling, determining a direction of travel;
determining a projected travel path of the user based on the direction of travel; and prioritizing identification of the remote set of I/O user devices, among the I/O user devices identified by the database, that satisfies the future proximity rule by being proximately located to the future location along the projected travel path and that satisfies the combined capability rule.

24. The method of claim 17, wherein the determining whether a remote set of I/O user devices satisfies the future proximity rule and the combined capability rule, comprises:
    determining whether the user is traveling;
    responsive to when the user is traveling, obtaining from a route planner a predicted route that the user is traveling; and
    prioritizing identification of the remote set of I/O user devices, among the I/O user devices identified by the database, that satisfies the future proximity rule by being proximately located to the future location along the predicted route and that satisfies the combined capability rule.

25. The method of claim 24, wherein the method further comprises:
    performing machine learning to update a historical route data structure to store information identifying machine tracked routes traveled by the user over time,
    wherein the obtaining from the route planner the predicted route that the user is traveling, comprises accessing the historical route data structure to obtain the predicted route using at least one of: time of day; day of week; the location of the user; and
    calendared meeting location contained in a user calendar application.

26. The method of claim 17, wherein the determining whether a remote set of I/O user devices satisfies the future proximity rule and the combined capability rule, comprises:
    identifying a mobile terminal type of I/O user device registered by another user and which has a location satisfying the future proximity rule and has a UI capability that is combinable with a UI capability of at least one other I/O user device to satisfy the combined capability rule, and where the at least one other I/O user device is determined to also satisfy the future proximity rule;
    sending a request to the mobile terminal operated by the other user requesting use of the mobile terminal to provide the communication service for the user; and
    responsive to receiving an indicated acknowledgement of acceptance of the request to the mobile terminal, including the mobile terminal and the at least one other I/O user device in the remote set of I/O user devices to provide the communication service to the user.

27. The method of claim 17, wherein the determining whether a remote set of I/O user devices satisfies the future proximity rule and the combined capability rule, comprises:
    identifying a remote operated vehicle transporting an I/O user device that can be relocated to the future location of the user to satisfy the future proximity rule and that has a UI capability that is combinable with a UI capability of at least one other I/O user device to satisfy the combined capability rule, and where the at least one other I/O user device is determined to also satisfy the future proximity rule;
    controlling the remote operated vehicle to move to a new location that satisfies the future proximity rule; and
    including the remote operated vehicle and the at least one other I/O user device in the remote set of I/O user devices to provide the communication service to the user.

28. The method of claim 17, wherein the determining whether a remote set of I/O user devices satisfies the future proximity rule and the combined capability rule, comprises:
    selecting at least one of: a camera having a field-of-view that is directionally steerable toward the future location satisfying the future proximity rule and where the camera has a UI capability that is combinable with a UI capability of at least one other I/O user device to satisfy the combined capability rule; and a microphone that has a sensitivity gain that is directionally steerable toward the future location satisfying the future proximity rule and where the microphone has a UI capability that is combinable with a UI capability of at least one other I/O user device to satisfy the combined capability rule;
    controlling the selected at least one of: the camera to directionally steer the field-of-view toward the future location; and the microphone to directionally steer the sensitivity gain toward the future location satisfying the future proximity rule; and
    including the selected at least one of the camera and the microphone in the remote set of I/O user devices to provide the communication service to the user.

29. The method of claim 17, when a local set of I/O user devices is determined to satisfy the present proximity rule and to satisfy the combined capability rule:
    providing communication sessions between the user terminal emulation application and the local set of I/O user devices and between the user terminal emulation application and the network entity;
    routing communication traffic between the network entity and the I/O user devices in the local set for the communication service;
    while routing the communication traffic, determining a service interrupt condition has occurred when a now-missing I/O user device in the local set is determined to no longer be available for use in the communication service and that no other I/O user device has the UI capability of the now-missing I/O user device and satisfies the present proximity rule;
    pausing further routing of at least some of the communication traffic between the network entity and the I/O user devices on the local set, responsive to the service interrupt condition; and
    communicating a message to the network entity that contains information identifying loss of the UI capability of the now-missing I/O user device for the communication service.

30. The method of claim 29, wherein the operations further comprise:
    negotiating with the network entity a modification to the combined capability rule;
    responsive to the negotiation, determining whether a modified local set of I/O user devices satisfy the present proximity rule and satisfy the modification to the combined capability rule;
    when the modified local set of I/O user devices satisfies the present proximity rule and the modification to the combined capability rule, restarting further routing of the communication traffic between the network entity and the modified local set of I/O user devices.

* * * * *